United States Patent

Okada

[11] Patent Number: 5,856,620
[45] Date of Patent: Jan. 5, 1999

[54] ACCELERATION SENSOR

[75] Inventor: Kazuhiro Okada, Ageo, Japan

[73] Assignee: Wacoh Corporation, Ageo, Japan

[21] Appl. No.: 776,172

[22] PCT Filed: May 29, 1996

[86] PCT No.: PCT/JP96/01439

§ 371 Date: Jan. 22, 1997

§ 102(e) Date: Jan. 22, 1997

[87] PCT Pub. No.: WO96/38732

PCT Pub. Date: Dec. 5, 1996

[30] Foreign Application Priority Data

May 31, 1995 [JP] Japan .................................. 7-157105
Feb. 6, 1996 [JP] Japan .................................. 8-044120

[51] Int. Cl.$^6$ .............................................. G01P 15/125
[52] U.S. Cl. ...................................... 73/514.32; 73/514.38
[58] Field of Search ........................... 73/514.16, 514.24, 73/514.32, 514.35, 514.38, 862.041, 862.042

[56] References Cited

U.S. PATENT DOCUMENTS

| | | | |
|---|---|---|---|
| 4,905,523 | 3/1990 | Okada | 73/862.04 |
| 4,967,605 | 11/1990 | Okada | 73/862.04 |
| 4,969,366 | 11/1990 | Okada | 73/862.08 |
| 5,014,415 | 5/1991 | Okada | 29/621.1 |
| 5,035,148 | 7/1991 | Okada | 73/862.04 |
| 5,092,645 | 3/1992 | Okada | 294/86.4 |
| 5,182,515 | 1/1993 | Okada | 324/259 |
| 5,263,375 | 11/1993 | Okada | 73/862.042 |
| 5,295,386 | 3/1994 | Okada | 73/1 D |
| 5,343,765 | 9/1994 | Okada | 73/862.043 |
| 5,365,799 | 11/1994 | Okada | 73/862.041 |
| 5,392,658 | 2/1995 | Okada | 73/862.43 |
| 5,406,848 | 4/1995 | Okada | 73/514.32 |
| 5,421,213 | 6/1995 | Okada | 73/862.043 |
| 5,492,020 | 2/1996 | Okada | 73/862.626 |
| 5,497,668 | 3/1996 | Okada | 73/862.626 |

FOREIGN PATENT DOCUMENTS 4-299227 10/1992 Japan .
7-325107 12/1995 Japan .
8-82638 3/1996 Japan .

*Primary Examiner*—Hezron E. Williams
*Assistant Examiner*—Richard A. Moller
*Attorney, Agent, or Firm*—Ladas & Parry

[57] ABSTRACT

A magnitude of an acceleration along a direction included within a predetermined plane is detected as an electric signal. A fixed substrate (10) and a displacement substrate (20) are disposed in parallel. The fixed substrate (10) is secured within a cylindrical casing, and the displacement substrate (20) is elastically supported at the periphery thereof within the cylindrical casing by supporting means (30). An annular displacement electrode (E21) and a central displacement electrode (E22) are provided on the upper surface of the displacement substrate (20), and a weight body (40) is secured on the lower surface of the displacement substrate (20). An annular fixed electrode and is a central fixed electrode opposite to the annular displacement electrode (E21) and the central displacement electrode (E22) are provided on the lower surface of the fixed substrate (10), and an annular capacitance element (C1) and a central capacitance element (C2) are constituted. By vibration of the earthquake, etc., the weight body (40) is oscillated. As a result, the displacement substrate (20) is caused to undergo an displacement with respect to the fixed substrate (10). Based on a change of the electrostatic capacitance value of the annular capacitance element (C1), a magnitude of the transverse vibration can be detected. Based on a change of the electrostatic capacitance value of the central capacitance element (C2), a magnitude of longitudinal vibration can be detected.

16 Claims, 12 Drawing Sheets

ACCELERATION SENSOR

TECHNICAL FIELD

This invention relates to an acceleration sensor and, more particularly, to an acceleration sensor suitable for detecting acceleration based on earthquake or collision of automotive vehicle.

BACKGROUND ART

In view of grasping movement of an object, detection of acceleration has important meaning. For this reason, various acceleration sensors have been conventionally proposed. Particularly, in recent years, the spotlight of attention upon multi-dimensional acceleration sensors capable of detecting two-dimensional or three-dimensional acceleration every respective directional components has been focused. For example, in the International Publication No. WO88/08522 based on the Patent Cooperation Treaty, a three-dimensional acceleration sensor using piezo resistance elements is disclosed. In this sensor, plural piezo resistance elements are formed at specific positions on a semiconductor substrate, thereby making it possible to respectively independently detect acceleration components in respective coordinate axes directions in the XYZ three-dimensional coordinate system. Moreover, in the International Publication No. WO91/10118 or the International Publication No. WO92/17759, a three-dimensional acceleration sensor using electrostatic capacitance elements is disclosed. In the International Publication No. WO93/02342, a three-dimensional acceleration sensor using piezoelectric elements is disclosed. In these sensors, plural electrodes are formed at specific positions, thereby making it possible to respectively independently detect acceleration components in respective coordinate axes directions in the XYZ three-dimensional coordinate system in a manner similar to the above.

In such three-dimensional acceleration sensors, since all of respective coordinate axes direction components of applied acceleration can be respectively independently detected by a single sensor, it is possible to specify an acceleration to be detected as a vector quantity within the three-dimensional space. Accordingly, such three-dimensional acceleration sensors can be widely utilized in use for precisely detecting acceleration exerted on an object moving within the three-dimensional space, e.g., a vehicle being traveled, or an air-plane being flown, etc. in a manner to include its direction. In future, it is expected that its utilization value will be increased.

On the other hand, the acceleration sensor can be utilized also as a seismometer or an impact detector. For example, in a control system for control valves of the city gas or a control system for control an elevator, an acceleration sensor functioning as a seismometer is included. In the case where an acceleration based on vibration of the earthquake exceeds a predetermined threshold value, the control system stops supply of gas, or stops an operation of the elevator. Moreover, in automotive vehicles with an air bag which begins being popularized rapidly in recent years, an acceleration sensor functioning as an impact detector is mounted, wherein there is employed a mechanism to momentarily swell the air bag to protect a driver in the case where an acceleration based on impact exceeds a predetermined threshold value. However, it is to be noted that the acceleration sensors used in seismometers or impact detectors are mainly mechanical type sensors which detect an acceleration by means of mechanical operation. For example, a mechanical sensor recognizes whether or not a steel ball is flown out from a bowl-shaped vessel, and judges whether or not an acceleration more than the threshold value is exerted.

As described above, the acceleration sensors utilized as seismometers or impact detectors are mainly mechanical type sensors for the present. However, such mechanical acceleration sensors have drawbacks that the detection accuracy or the reliability is low, and it is difficult to electrically take out detection results. On the other hand, three-dimensional acceleration sensors using piezo resistance elements, capacitance elements or piezoelectric elements have a high detection accuracy and reliability, and can electrically take out detection results. However, for the purpose of the seismometer or the impact detector, such three-dimensional acceleration sensors are not necessarily required. On the contrary, there are even instances where the conventional three-dimensional acceleration sensor is difficult to use.

For example, for the purpose of measuring an intensity of the earthquake, it is sufficient to provide a function to respectively independently detect a magnitude of "transverse vibration (vibration in the horizontal direction)" and a magnitude of "longitudinal vibration (vibration in the vertical direction)". In this case, it is desirable to have an ability of directly detecting the magnitude of "transverse vibration" and the magnitude of "longitudinal vibration". Generally, it is known that the "transverse vibration" in the earthquake is a vibration resulting from a wave called "S-wave", and the "longitudinal vibration" is a vibration resulting from a wave called "P-wave". As long as it is possible to respectively independently detect the magnitude of the S-wave and the magnitude of the P-wave, such a detection mechanism can sufficiently function as a seismometer. Namely, when an XYZ three-dimensional coordinate system respectively having an XY-plane on the horizontal surface and a Z-axis in the vertical direction is defined at a certain measurement point, if a magnitude of vibration in the direction along the XY-plane (transverse vibration) and a magnitude of vibration in the direction along the Z-axis (longitudinal vibration) can be measured, such a measurement mechanism can sufficiently function as a seismometer It is a matter of course that even if a conventionally proposed three-dimensional acceleration sensor is employed, such a measurement can be made. If the conventional three-dimensional acceleration sensor is used as a seismometer, a precise detection can be made in which even a particular direction of vibration is specified such as "transverse vibration directed to north-northeast", etc. However, for the purpose of carrying out supply control of the city gas or operation control of an elevator, it is unnecessary to specify as far as azimuth (direction) of the transverse vibration. Actually, when a magnitude of transverse vibration exceeds a predetermined threshold value, irrespective of "transverse vibration directed to north-northeast" or "transverse vibration directed to southeast", it is necessary to stop the supply of the city gas or the operation of the elevator. As long as even a magnitude of the transverse vibration can be detected, it is possible to sufficiently perform the function as an seismometer. Moreover, in the conventional three-dimensional acceleration sensor, since X-axis direction component $\alpha x$, Y-axis direction component $\alpha y$ and Z-axis direction component $\alpha z$ are respectively independently detected with respect to an acceleration in the XYZ three-dimensional coordinate system, an operation (calculation) to obtain a sum of $\alpha x^2 + \alpha y^2$ and to obtain a square root of this sum is required in order to determine a magnitude of the transverse vibration along the XY plane.

As stated above, the conventional three-dimensional acceleration sensors can be used as a seismometer. However, since the structure thereof is complicated and a particular operation circuit is required to function as a seismometer, there results the problem that the cost is increased as a whole. Particularly, when attention is drawn to utilization to the supply control of city gas or the operation control of elevator, there is the necessity of respectively installing such an acceleration sensor within every gas meter of respective homes or every control unit of respective elevators. Therefore, realization of low cost acceleration sensors having simple structure is expected.

Such circumstances are the same also in an acceleration sensor used as an impact detector for operating an air bag of the automotive vehicles. If the traveling surface of the automotive vehicles is assumed to be XY plane, an impact produced by collision of the automotive vehicle is the impact mainly including an acceleration component along the XY plane. Accordingly, an acceleration component along the Z-axis can be neglected. In addition, irrespective of whether the corresponding collision is a frontal (head-on) collision or a side collision, the fact that the impact which allows a driver to suffer from risk is applied is the same. Namely, even if a collision in any direction takes place, there is the necessity of swelling the air bag to protect the driver. Accordingly, when a magnitude of acceleration components in the directions along the XY plane can be detected, such an acceleration detection system sufficiently satisfies the purpose. Namely, it is unnecessary to precisely detect as far as the direction.

With the above in view, an object of this invention is to provide an acceleration sensor suitable for detecting, as an electric signal, a magnitude of acceleration directed toward the directions included within a predetermined plane.

DISCLOSURE OF THE INVENTION (1) A first feature of this invention is directed to an acceleration sensor comprising:

a sensor casing;

a fixed substrate secured to the sensor casing;

a displacement substrate disposed below the fixed substrate with a predetermined distance so as to be opposite to the fixed substrate;

supporting means for elastically (resiliently) supporting a periphery of the displacement substrate with respect to the sensor casing;

a weight body secured to the displacement substrate and having a mass sufficient to allow the supporting means to induce an elastic (resilient) deformation by action of an acceleration to be detected;

an annular fixed electrode formed on the lower surface of the fixed substrate and having an annular shape;

an annular displacement electrode formed on the upper surface of the displacement substrate and functioning as an opposite electrode with respect to the annular fixed electrode; and a detection circuit for outputting an electric signal indicating a magnitude of an acceleration component in a direction in parallel to the principal surface of the fixed substrate on the basis of a value of change V1 of an electrostatic capacitance of an annular capacitance element constituted by the annular fixed electrode and the annular displacement electrode.

(2) A second feature of this invention is such that, in the above-described acceleration sensor according to the first feature, there are further provided:

a central fixed electrode disposed within an inside region of the annular fixed electrode on the lower surface of the fixed substrate; and a central displacement electrode disposed within an inside region of the annular displacement electrode on the upper surface of the displacement electrode, and functioning as an opposite electrode with respect to the central fixed electrode;

wherein the detection circuit carries out a correction with respect to a value of change V1 of the electrostatic capacitance of the annular capacitance element by using a value of change V2 of the electrostatic capacitance of a central capacitance element constituted by the central fixed electrode and the central displacement electrode so as to output an electric signal indicating a magnitude of an acceleration component in a direction in parallel to the principal surface of the fixed substrate on the basis of the corrected value.

(3) A third feature of this invention is such that, in the above-described acceleration sensor according to the second feature:

the detection circuit further outputs an electric signal indicating a magnitude of an acceleration component in a direction perpendicular to the principal surface of the fixed substrate on the basis of a value of change V2 of the electrostatic capacitance of the central capacitance element.

(4) A fourth feature of this invention is such that, in the above-described acceleration sensor according to the second or third feature:

the annular fixed electrode, the annular displacement electrode, the central fixed electrode and the central displacement electrode have a shape of substantially rotation symmetry with respect to the center axis passing through the center of gravity of the weight body and perpendicular to the principal surface of the fixed substrate.

(5) A fifth feature of this invention is such that, in the above-described acceleration sensor according to any one of the second to fourth features:

there is employed a configuration such that a distance d1 between a pair of electrodes constituting the annular capacitance element and a distance d2 between a pair of electrode constituting the central capacitance element are equal to each other; and the detection circuit outputs an electric signal indicating a magnitude of an acceleration component in a direction in parallel to the principal surface of the fixed substrate on the basis of a value Vs obtained by performing a correcting operation of $$Vs = V1 - (S1/S2) \cdot V2,$$

where V1 is a change of the electrostatic capacitance of the annular capacitance element, V2 is a change of the electrostatic capacitance of the central capacitance element, S1 is an area of respective electrodes constituting the annular capacitance element and S2 is an area of respective electrodes constituting the annular capacitance element.

(6) A sixth feature of this invention is such that, in the above-described acceleration sensor according to any one of the second to fourth features:

there is employed a configuration in which a relationship of $$S1/(d1)^2 = S2/(d2)^2$$

is established between a distance d1 of a pair of electrodes constituting the annular capacitance element, a distance d2 of a pair of electrodes constituting the central capacitance element, an area S1 of respective electrodes constituting the annular capacitance element and an area S2 of respective electrodes constituting the central portion capacitance element; and the detection circuit outputs an electric signal indicating a magnitude of an acceleration component in a direction in parallel to the principal surface of the fixed substrate on the basis of value Vs obtained by performing an correcting operation of $$Vs=V1-V2$$

where V1 is a change of the electrostatic capacitance of the annular capacitance element and V2 is a change of the electrostatic capacitance of the central capacitance element.

(7) A seventh feature of this invention is such that, in the above-described acceleration sensor according to the sixth feature:

there is employed a configuration in which a distance d1 between a pair of electrodes constituting the annular capacitance element and a distance d2 between a pair of electrodes constituting the central capacitance element are equal to each other, and an area S1 of respective electrodes constituting the annular capacitance element and an area S2 of respective electrodes constituting the central capacitance element are equal to each other.

(8) An eighth feature of this invention is such that, in the above-described acceleration sensor according to any one of the second to fourth features:

the detection circuit includes a circuit for multiplying a value of change V1 of the electrostatic capacitance of the annular capacitance element by a predetermined constant K11 to obtain a product K11·V1, a circuit for multiplying said value of change V1 by a predetermined constant K21 to obtain a product K21·V1, a circuit for multiplying a value of change V2 of the electrostatic capacitance of the central capacitance element by a predetermined constant K12 to obtain a product K12·V2, a circuit for multiplying said value of change V2 by a predetermined constant K22 to obtain a product K22·V2, a circuit for performing an operation expressed as $$Vs=(K11 \cdot V1)-(K12 \cdot V2)$$

to obtain a value Vs, and a circuit for performing an operation expressed as $$Vp=(K21 \cdot V1)-(K22 \cdot V2)$$

to obtain a value Vp; and said detection circuit outputs an electric signal indicting a magnitude of an acceleration component in a direction in parallel to the principal surface of the fixed substrate on the basis of the value Vs and an electric signal indicating a magnitude of an acceleration component in a direction perpendicular to the principal surface of the fixed substrate on the basis of the value Vp.

(9) A ninth feature of this invention is such that, in the above-described acceleration sensor according to the second or third feature:

the annular fixed electrode and the annular displacement electrode have a shape of non-rotation symmetrical with respect to a center axis passing through a center of gravity of the weight body and perpendicular to a principal surface of the fixed substrate.

(10) A tenth feature of this invention is such that, in the above-described acceleration sensor according to any one of the second to ninth features:

the annular displacement electrode and the central displacement electrode are constituted by a physically unitary (single) common electrode.

(11) An eleventh feature of this invention is such that, in the above-described acceleration sensor according to the tenth feature:

the displacement substrate is constituted by conductive material, and a portion of the displacement substrate is used as a unitary (single) common electrode.

(12) A twelfth feature of this invention is such that, in the above-described acceleration sensor according to any one of the second to ninth features:

the annular fixed electrode and the central fixed electrode are constituted by a physically unitary (single) common electrode.

(13) A thirteenth feature of this invention is such that, in the above-described acceleration sensor according to the twelfth feature:

the fixed substrate is constituted by conductive material, and a portion of the fixed substrate is used as a unitary (single) common electrode.

(14) A fourteenth feature of this invention is such that, in the above-described acceleration sensor according to any one of the first to thirteenth features:

a flexible substrate having a plurality of slits is provided to constitute a diaphragm which functions as a displacement substrate and supporting means.

(15) A fifteenth feature of this invention is such that, in the above-described acceleration sensor according to the fourteenth feature:

a first group of slits are located along annular lines surrounding a central point of the flexible substrate and a second group of slits are located along radial lines from the central point of the flexible substrate toward an external so that a structure such that respective portions of the diaphragm are physically connected by beam portions; and a peripheral portion of the diaphragm is secured to the sensor casing to provide a structure in which a displacement is produced in a central part of the diaphragm on the basis of an elastic deformation of the beam portions.

(16) A sixteenth feature of this invention is such that, in the above-described acceleration sensor according to the fourteenth or fifteenth feature:

wherein the respective slits are provided so that when the flexible substrate is rotated by a predetermined angle θ within a plane including a principal surface thereof, a pattern of the slits is substantially in correspondence with a pattern before rotation.

BEST MODE FOR CARRYING OUT INVENTION

§0 Fundamental Principle of this Invention

Figure 1:
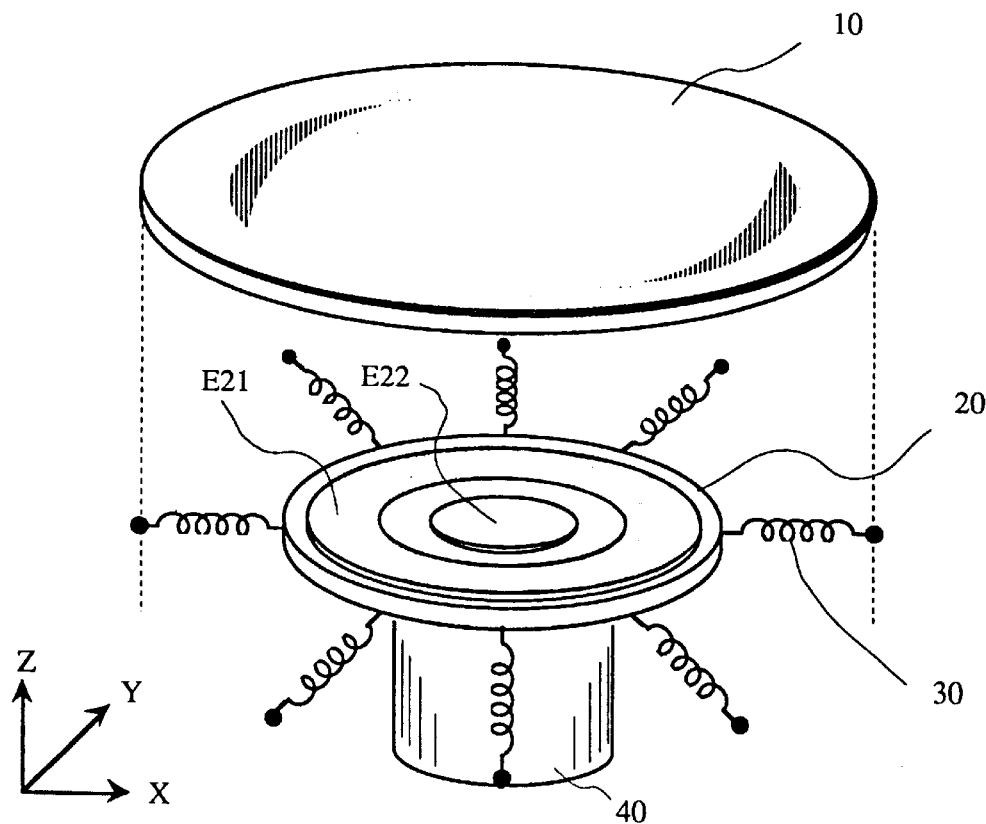
FIG. 1 is a perspective view of the main part of an acceleration sensor according to the fundamental embodiment of this invention.

In an acceleration sensor according to this invention, a fixed substrate and a displacement substrate are provided within a casing, and an annular fixed electrode and an annular displacement electrode are respectively formed on the fixed substrate and the displacement substrate. The both annular electrodes are disposed in a manner opposite to each other. Thus, an annular capacitance element is formed. The periphery of the displacement substrate is elastically (resiliently) supported by supporting means. By applying force to the displacement substrate, the displacement substrate can be caused to undergo displacement such that it is inclined or it is caused to undergo parallel movement relative to the fixed substrate. A weight body is secured to the displacement substrate. When acceleration is applied to the entirety of the sensor casing, force based on this acceleration is applied to the weight body. Thus, an elastic deformation takes place in the supporting means. As a result, the displacement substrate is caused to undergo displacement relative to the fixed substrate.

Assuming now that an acceleration in a parallel direction (in a lateral direction) with respect to a principal surface of the fixed substrate is applied, the displacement substrate is inclined with respect to the fixed substrate. As a result, a change takes place in the electrostatic capacitance value of the annular capacitance element. Thus, it is possible to detect a magnitude of the applied acceleration on the basis of the change of the electrostatic capacitance value. Here, if respective annular electrodes have a shape of substantially rotation symmetry with respect to the center axis, the change of the electrostatic capacitance value is equivalent phenomenon with respect to all directions in parallel to the principal surface of the fixed substrate. Accordingly, even if accelerations in any (arbitrary) directions in parallel to the principal surface of the fixed substrate is applied, it becomes possible to equally detect magnitudes thereof. In addition, if respective annular electrodes are caused to intentionally have a shape of non-rotation symmetry, an acceleration sensor of which detection sensitivities vary in dependency upon directions in parallel to the principal surface of the fixed substrate can be realized.

It is to be noted that a change of a distance between both the annular electrodes is caused by not only an acceleration in a horizontal direction (in a lateral direction) but also an acceleration in a vertical direction (in a longitudinal direction) with respect to the principal surface of the fixed substrate. Therefore, a change takes place in the electrostatic capacitance value of the annular capacitance element by not only an acceleration component in horizontal direction but also an acceleration component in vertical direction. Accordingly, in order to precisely detect only an acceleration component in the lateral direction under the environment where an acceleration component in the longitudinal direction may be applied as well, it is necessary to carry out a correction for eliminating a part of change based on the acceleration component in the longitudinal direction from a total change of the electrostatic capacitance value obtained. To realize this, a central fixed electrode is provided within an inside region of the annular fixed electrode, and a central displacement electrode is provided within an inside region of the annular displacement electrode. By such a pair of central electrodes, a central capacitance element is formed. When an acceleration in the longitudinal direction is applied, a change takes place in a distance between the fixed substrate and the displacement substrate. For this reason, an electrostatic capacitance value of the central capacitance element changes in dependency upon such a distance change. Accordingly, if a correction with respect to the electrostatic capacitance value of the annular capacitance element is carried out on the basis of the change of the electrostatic capacitance value of the central capacitance element, it becomes possible to output only an acceleration component in the lateral direction which does not include an acceleration component in the longitudinal direction. It is a matter of course that if an approach is employed to output, as an acceleration component in the longitudinal direction, a change of the electrostatic capacitance value of the central capacitance element, acceleration detections in both longitudinal and lateral directions can be carried out.

It is to be noted that since it is not necessarily required that respective electrodes are respectively physically independent electrodes, if, e.g., the annular displacement electrode and the central displacement electrode are constituted by a physically unitary (single) common electrode, or the annular fixed electrode and the central fixed electrode are constituted by a physically (unitary) single common electrode, the structure can be simplified. Further, if the displacement substrate or the fixed substrate is comprised of conductive material, a portion of such substrate can be utilized as the common electrode. Thus, the structure can be further simplified.

It is further to be noted that when a diaphragm in which plural slits are formed is used as a displacement substrate and supporting means, the structure is simplified, so the manufacturing cost can be reduced. Particularly, by providing plural slits formed along annular lines surrounding a central point and plural slits formed along radial lines from the central point toward the external, directivity with respect to bending of the diaphragm can be uniform. Thus, it becomes possible to substantially uniformly detect all accelerations (acceleration components) in the lateral direction. In addition, if a pattern of slits is caused to be substantially in correspondence with a pattern rotated by a predetermined angle θ, directivity with respect to bending of the diaphragm can be uniform. Thus, it becomes possible to substantially uniformly detect all accelerations (acceleration components) in the lateral direction.

§1 Structure of the Fundamental Embodiment of this Invention

Figure 2:
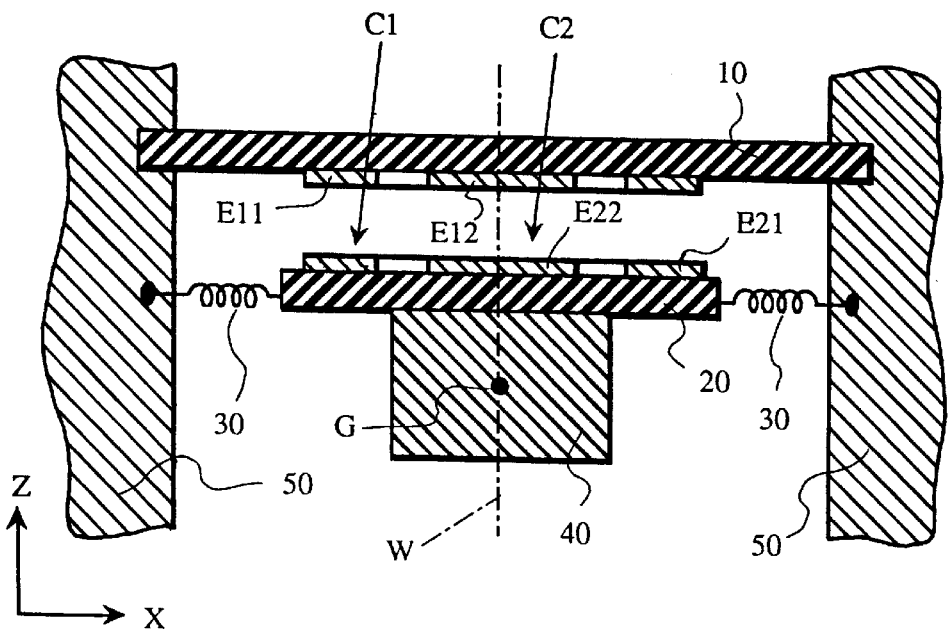
FIG. 2 is a side cross sectional view of the acceleration sensor shown in FIG. 1.

A perspective view of the principal part of the acceleration sensor according to the fundamental embodiment of this invention is shown in FIG. 1, and the side cross sectional view thereof shown in FIG. 2. As shown in FIG. 1, this acceleration sensor includes a disk-shaped fixed substrate 10 and a similarly disk-shaped displacement substrate 20, wherein supporting means 30 is attached at the periphery of the displacement substrate 20. Moreover, a columnar weight body 40 is secured to the lower surface of the displacement substrate 20. These components are all accommodated within a cylindrical sensor casing 50 (not shown in FIG. 1). The side cross sectional view of FIG. 2 indicates the cross section where these components are cut along the plane including a center axis W passing through the center of gravity G of the weight body 40. In FIG. 2, the sensor casing 50 which is not shown in FIG. 1 is also shown. As seen with reference to FIG. 2, the periphery of the fixed substrate 10 is fitted and secured to the inside of the sensor casing 50. In other words, the periphery of the disk-shaped fixed substrate 10 is secured to the inside of the cylindrical sensor casing 50 over the entire circumference thereof. On the other hand, the displacement substrate 20 is supported on the inside of the sensor casing 50 by the supporting means 30 attached to the periphery thereof. The supporting means 30 has a function to elastically support the periphery of the displacement substrate 20 with respect to the sensor casing 50. While the example where eight springs are used as a supporting means 30 is disclosed in the fundamental embodiment, it is preferable from a viewpoint of practical use that, as described later, a diaphragm including slits, or the like is used to constitute the displacement substrate 20 and the supporting means 30.

In the state where no acceleration is applied with respect to the sensor casing 50, the fixed substrate 10 and the displacement substrate 20 are maintained substantially in parallel state with a distance therebetween as shown in FIG. 2. However, when an acceleration is applied to the sensor casing 50, force based on the acceleration is applied to the center of gravity G of the weight body 40. By this force, the supporting means 30 is caused to undergo elastic deformation. As a result, the displacement substrate 20 is caused to undergo displacement relative to the fixed substrate 10. For example, if this acceleration sensor is installed at a predetermined earthquake observation point, when an earthquake takes place, an acceleration is applied to the weight body 40 on the basis of vibration at the observation point. As a result, there takes place an oscillation such that the displacement substrate 20 is caused to undergo displacement with respect to the fixed substrate 10. It is a matter of course that the weight body 40 must have a mass sufficient for allowing the supporting means 30 to induce elastic deformation by action of an acceleration to be detected. The sensitivity of the acceleration sensor can be adjusted by suitably selecting an elastic coefficient of the supporting means 30 and mass of the weight body 40.

It is to be noted that, for convenience of explanation, an XYZ three-dimensional coordinate system as shown in the left lower portion of FIG. 1 is defined. The principal surfaces of the fixed substrate 10 and the displacement substrate 20 are surfaces in parallel to the XY plane in this coordinate system. Moreover, in this instance, as shown in FIG. 2, the center axis W passing through the center of gravity G of the weight body 40 and in parallel to the Z axis is defined. In this embodiment, the fixed substrate 10, the displacement substrate 20, the weight body 40 and the sensor casing 50 are all body of rotation symmetry with respect to the center axis W. While it is ideally preferable that there is employed a structure such that the supporting body 30 is also rotation-symmetrical with respect to the center axis W. In this embodiment, the supporting means 30 is formed by eight springs so that behavior of rotation symmetry can be obtained as far as possible.

Figure 3:
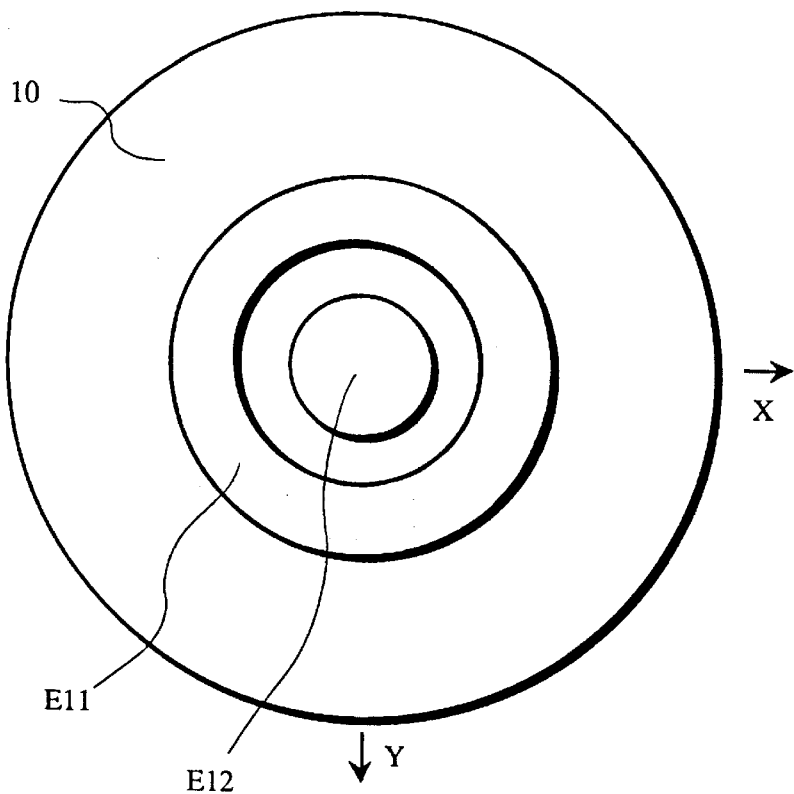
FIG. 3 is a bottom view of the fixed substrate 10 of the acceleration sensor shown in FIG. 1.
Figure 4:
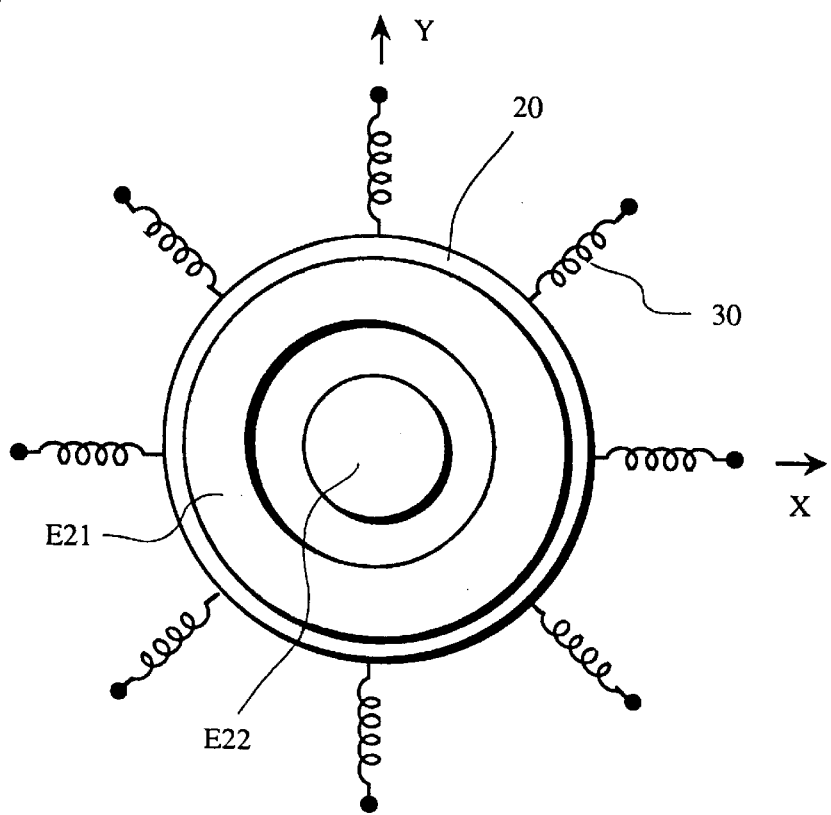
FIG. 4 is a top view of the displacement substrate 20 of the acceleration sensor shown in FIG. 1.

Now, the important point in this acceleration sensor is that electrodes are respectively formed on the lower surface of the fixed substrate 10 and the upper surface of the displacement substrate 20. The bottom view of the fixed substrate 10 is shown in FIG. 3, and the top view of the displacement substrate 20 is shown in FIG. 4. As shown in FIG. 3, an annular fixed electrode E11 and a central fixed electrode E12 are formed on the lower surface of the fixed substrate 10. Moreover, as shown in FIG. 4, an annular displacement electrode E21 and a central displacement electrode E22 are formed on the upper surface of the displacement substrate 20. The annular fixed electrode E11 and the annular displacement electrode E21 are both an annulus (so called washer shaped or doughnut shaped) electrode. These electrodes have a shape of rotation symmetry with respect to the center axis W shown in FIG. 2, and are disposed at positions of rotation symmetry. On the other hand, the central fixed electrode E12 and the central displacement electrode E22 are both a disk-shaped electrode. These electrodes similarly have a shape of rotation symmetry with respect to the center axis W shown in FIG. 2, and are disposed at positions of rotation symmetry. The annular fixed electrode E11 and the annular displacement electrode E21 have the same shape, and are disposed at positions opposite to each other. By such a pair of electrodes E11 and E21, a capacitance element is formed. In this example, this capacitance element is called an annular capacitance element C1. On the other hand, the central fixed electrode E12 and the central displacement electrode E22 have the same shape, and are disposed at positions opposite to each other. By such a pair of electrodes E12 and E22, a capacitance element is formed. In this example, this capacitance element is called a central capacitance element C2.

It is to be noted while a hatching is implemented to the respective electrodes in FIGS. 3 and 4, such a hatching is made for the purpose of easily grasping the shapes of the electrodes and is not for indicating a cross section. This similarly applies to the other figures, and all of hatchings implemented to the electrodes in the plan views of the drawings are not for indicating a cross section.

Further, although materials of respective portions of the acceleration sensor shown in the fundamental embodiment have not been particularly described so far, at least the electrodes E11, E12, E21, E22 are required to be constituted by conductive material such as metal, etc. In addition, the fixed substrate 10 and the displacement substrate 20 may be constituted by conductive material, or may be constituted by insulating material. It is to be noted that when they are constituted by conductive material, in order that two electrodes formed thereon are not short-circuited, it is necessary to form an insulating film between the substrate and the electrode. However, in the case where a common electrode described in chapter §6 is constituted, there is no such requirement.

§2 Transverse Vibration Detecting Operation of the Fundamental Embodiment of this Invention Subsequently, a detecting operation of the embodiment described in chapter §1 will be described below. The feature of the acceleration sensor according to this invention is ability to detect "transverse vibration" and "longitudinal vibration" with distinction therebetween. It is now assumed that "transverse vibration" means vibration in the direction along the XY plane in the XYZ three-dimensional coordinate system and "longitudinal vibration" means vibration along the Z-axis in this coordinate system. It is generally known that "transverse vibration" in earthquake is vibration based on S-wave, and "longitudinal vibration" is vibration based on P-wave. In a seismometer, it is desirable to respectively independently detect vibrations based on the both waves. An operation for detecting vibration based on S-wave, i.e., "transverse vibration" according to the present invention will be initially described. In the embodiment described in chapter §1, an amplitude of "transverse vibration" is detected on the basis of an electrostatic capacitance value of the annular capacitance element C1 constituted by the annular fixed electrode E11 and the annular displacement electrode E21.

It is now assumed that an acceleration sensor shown in FIGS. 1 and 2 is installed at a predetermined observation point and the observation point is assumed to be vibrated in the X-axis direction by an earthquake. Such a vibration is a "transverse vibration" based on the S-wave. When the observation point is reciprocally vibrated in both positive and negative directions of the X-axis, the weight body 40 is oscillated in the X-axis direction within the sensor casing 50. Namely, acceleration αx in the X-axis direction is applied to the weight body 40. For this reason, a force expressed by Fx=m·αx is applied to the center of gravity G of the weight body 40 having mass m. As previously described, elastic deformation is produced in the supporting means 30 by action of such a force Fx. As a result, the displacement substrate 20 is inclined with respect to the fixed substrate 10.

Figure 5:
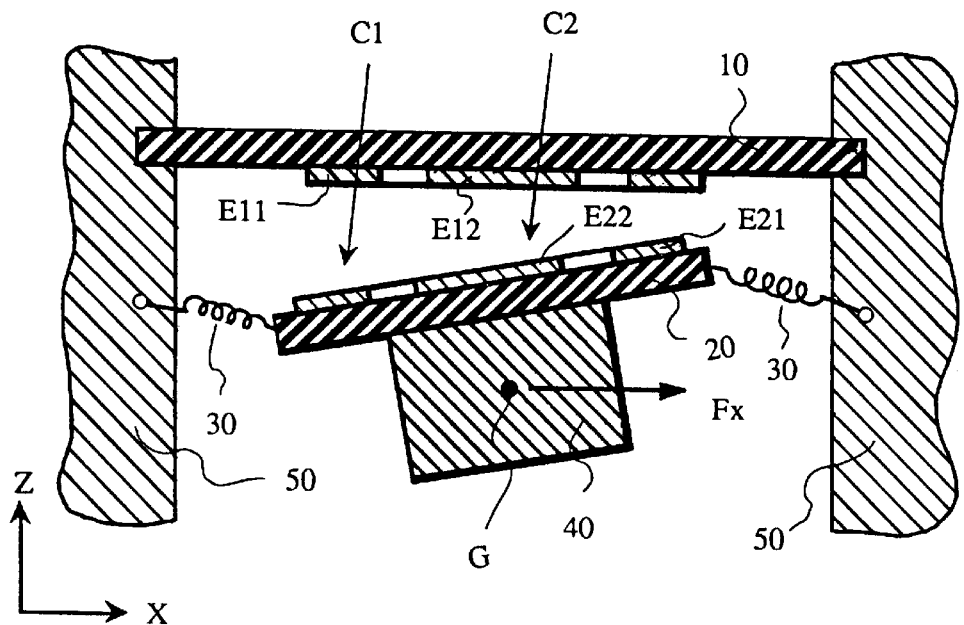
FIG. 5 is a side cross sectional view for explaining an operation when force Fx in the positive direction of the X-axis is applied to the acceleration sensor shown in FIG. 1.

The side cross sectional view of FIG. 5 shows the state of inclination of the displacement substrate 20 when force Fx is applied in the positive direction of the X-axis. Of course, since an oscillation of "traverse vibration" by the earthquake alternately produces an acceleration in the positive direction of the X-axis and an acceleration in the negative direction of the X-axis, a force Fx in the positive direction of the X-axis and a force −Fx in the negative direction of the X-axis are alternately applied to the weight body 40. FIG. 5 shows an instantaneous state in the oscillation.

Let now consider how an electrostatic capacitance value of the annular capacitance element C1 changes when the displacement substrate 20 is inclined as shown in FIG. 5. Generally, an electrostatic capacitance value C of a capacitance element is expressed as follows:

$$C=\epsilon(S/d)$$

In the above relational expression, $\epsilon$ is a dielectric constant of medium (air in this embodiment) existing between both the electrodes forming the capacitance element, S is an area of the electrode, and d is a distance between the electrodes. When the displacement substrate 20 changes from a state as shown in FIG. 2 to a state as shown in FIG. 5, a great change takes place in connection with the distance between the electrodes with respect to the annular capacitance element C1. Namely, in FIG. 5, a distance d between the electrodes becomes smaller in the right half portion and a distance d between the electrodes becomes large in the left half portion. It is to be noted that since the electrode itself is inclined, a slight change takes place also in the effective area of the electrode to constitute a capacitance, but since such a change is very small as compared to the change of the distance between the electrodes, the change in the area of the electrode is neglected here.

Figure 6:
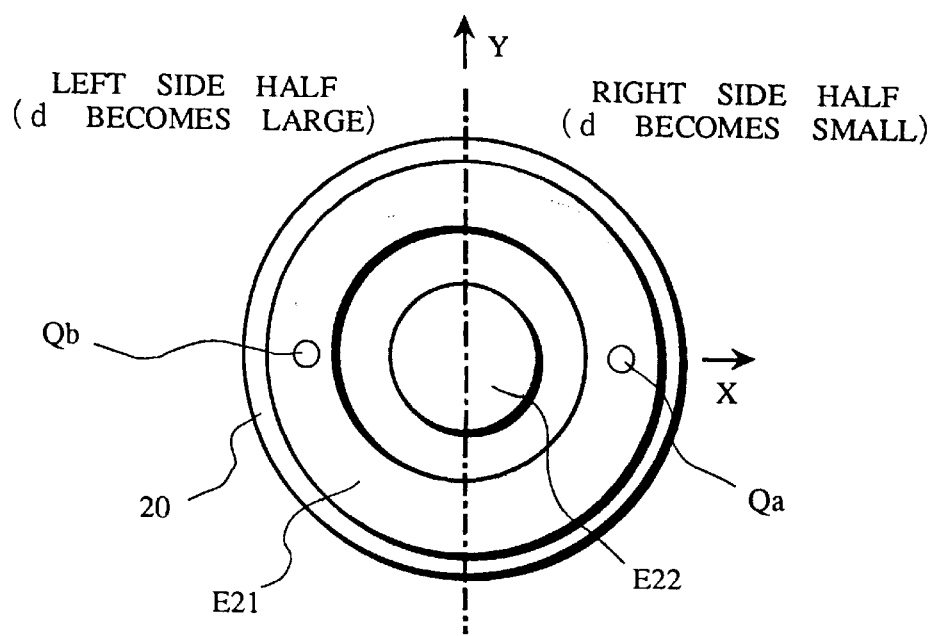
FIG. 6 is a top view of the displacement substrate 20 for indicating change of an electrostatic capacitance value in the state shown in FIG. 5.

FIG. 6 is a top view of the displacement substrate 20 for indicating distribution of changes of such a distance d between the electrodes. With single dotted lines depicted along the Y-axis being as a boundary line, a distance d between the electrodes becomes smaller in the right side half of the figure, whereas a distance d between the electrodes becomes larger in the left side half of the figure. Accordingly, when the above-described relational expression of the electrostatic capacitance value C is taken into consideration, the electrostatic capacitance value is increased in the right side half of the figure, whereas it is decreased in the left side half of the figure. Meanwhile, since the annular displacement electrode E21 has a rotation symmetry shape with respect to the center axis W (an annular shape with the center axis W being as a center in this embodiment), the annular displacement electrode E21 is linearly symmetrical with respect to the single dotted line of the figure as a matter of course. Accordingly, since even if the electrostatic capacitance value is increased in the right side half of the figure, it is decreased in the left side half of the figure, changes of the electrostatic capacitance value of the entirety of the annular capacitance element C1 are canceled in the left and right sides. It looks that any difference does not take place in the electrostatic capacitance value of the annular capacitance element C1 with respect to the state shown in FIG. 2 and the state shown in FIG. 5. However, in practice, a difference takes place in the electrostatic capacitance value of the annular capacitance element C1 with respect to these two states. The reason thereof will be described below.

Now, as shown in FIG. 6, a very small region Qa is defined in the right side half of the annular displacement electrode E21 and a very small region Qb is defined in the left side half. It is here assumed that the very small region Qa and the very small region Qb exist at the positions linearly symmetrical with respect to the Y-axis (single dotted line) and have the same shape and the same area Sq. Let consider very small capacitance elements Ca, Cb formed by these very small regions Qa, Qb and very small regions within the annular fixed electrode E11 opposite thereto and also consider what electrostatic capacitance values of the capacitance elements Ca, Cb change.

It is first assumed that the fixed substrate 10 and the displacement substrate 20 are in the state in parallel to each other as shown in FIG. 2. In this state, a distance between the annular fixed electrode E11 and the annular displacement electrode E21 is supposed to be d0, so that an electrostatic capacitance value Ca(0) of the capacitance element Ca and an electrostatic capacitance value Cb(0) of the capacitance element Cb are expressed as follows:

$$Ca(0)=Cb(0)=\epsilon(Sq/d0)$$

Thus, both the electrostatic capacitance values are equal to each other. It is further assumed that, as shown in FIG. 5, since force Fx in the positive direction of the X-axis is applied to the weight body 40, the displacement substrate 20 is inclined with respect to the fixed substrate 10, so a distance between the very small region Qa and the annular fixed electrode E11 is shortened by $\Delta d$ and a distance between the very small region Qb and the annular fixed electrode E11 is elongated by $\Delta d$. In this case, the electrostatic capacitance value of the capacitance element Ca becomes a new value Ca(+x) which is larger than the initial value Ca(0) by $\Delta Ca$ corresponding to a difference $\Delta d$ between the distances of the electrodes. On the other hand, the electrostatic value of the capacitance element Cb becomes a new value Cb(+) which is smaller than the initial value Cb(0) by $\Delta Cb$ corresponding to a difference $\Delta d$ between the distances of the electrodes. Namely, the electrostatic capacitance value of the capacitance element Ca is increased by $\Delta Ca$, whereas the electrostatic capacitance value of the capacitance element Cb is decreased by $\Delta Cb$. Accordingly, increment and decrement values of the both capacitance values seem to be canceled. Thus, it looks that there is no change in the total electrostatic capacitance value of the capacitance element Ca and the capacitance element Cb.

Figure 7:
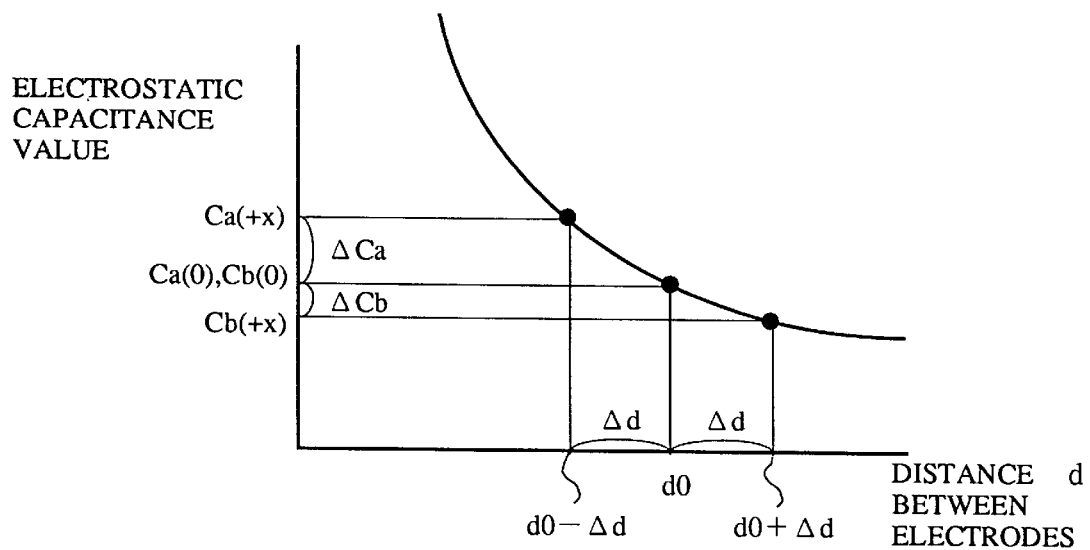
FIG. 7 is a graph showing general relationship between distance d between electrodes and electrostatic capacitance value C in an electrostatic capacitance element.

However, such a way of thinking is wrong. The reason thereof is that $\Delta Ca$ and $\Delta Cb$, which are changes of the electrostatic capacitance values, are not equal to each other. This can be easily understood if looking at the graph of FIG. 7. As previously described, an inversely proportional relationship is held between the distance d of the electrodes constituting the capacitance element and the electrostatic capacitance value C thereof. When the relationship therebetween is graphically represented, e.g., the graph of FIG. 7 is provided. Assuming now that both the substrates 10 and 20 are in a state in parallel to each other as shown in FIG. 2, the distances of the electrodes of the capacitance elements Ca, Cb are both the same value of d0, and the electrostatic capacitance values Ca(0), Cb(0) of the capacitance elements Ca, Cb are equal to each other. When the displacement substrate 20 is inclined with respect to the fixed substrate 10 as shown in FIG. 5 because force Fx in the positive direction of the X-axis is applied to the weight body 40, the distance of the electrodes of the capacitance element Ca becomes a small value of d0−$\Delta d$. As a result, the electrostatic capacitance value of the capacitance element Ca is increased by $\Delta Ca$ so that a new value Ca(+x) is obtained. On the other hand, the distance of the electrodes of the capacitance element Cb becomes a large value of d0+$\Delta d$. As a result, the electrostatic capacitance value of the capacitance element Cb is decreased by $\Delta Cb$ so that a new value Cb(+x) is obtained. In this case, it is important that although changes $\Delta d$ of the distances of the electrodes are equal to each other in both the capacitance elements Ca and Cb, the changes $\Delta Ca$ and $\Delta Cb$ of the electrostatic capacitance values are not equal to each other.

Eventually, when a change in state takes place from the first state shown in FIG. 2 to the second state shown in FIG. 5, the electrostatic capacitance value of the capacitance element Ca constituted by the very small region Qa in the right side is increased by $\Delta Ca$ and the electrostatic capacitance value of the capacitance element Cb constituted by the very small region Qb in the left side is decreased by $\Delta Cb$, but $\Delta Ca$ and $\Delta Cb$ do not equal to each other ($\Delta Ca > \Delta Cb$). Therefore, an attention is drawn to the total electrostatic capacitance value of both the capacitance elements Ca and Cb, the total electrostatic capacitance value is increased by value of ($\Delta Ca - \Delta Cb$) resulting from a change in state from the first state shown in FIG. 2 to the second state shown in FIG. 5.

While the electrostatic capacitance value of the very small region Qa in the right side half and the electrostatic capacitance value of the very small region Qb in the left side half shown in FIG. 6 have been discussed until now, when it is considered that such a phenomenon similarly takes place also in connection with the entire area of the right side half and the entire area of the left side half of the annular displacement electrode E21, it can be understood that the electrostatic capacitance value of the entirety of the annular capacitance element C1, which is constituted by the annular displacement electrode E21 and the annular fixed electrode E11, in the second state shown in FIG. 5 is smaller than that in the first state shown in FIG. 2.

While study has been made in connection with the state where the moment force Fx in the positive direction of the X-axis is applied to the weight body 40 as shown in FIG. 5, a similar phenomenon takes place also in connection with the state where the moment force −Fx in the negative direction of the X-axis is applied to the weight body 40 in a manner opposite to the above. Namely, in the case where force −Fx in the negative direction of the X-axis is applied, there results a state where the relationship between the electrostatic capacitance value in the left side half and the electrostatic capacitance value in the right side half is opposite to that of the state shown in FIG. 5. That is, the electrostatic capacitance value in the left side half of the annular capacitance element C1 is increased by $\Sigma\Delta Ca$, and the electrostatic capacitance value in the right side half is decreased by $\Sigma\Delta Cb$ ($\Sigma$ means sum of changes with respect to respective small regions). Accordingly, the electrostatic capacitance value of the entirety of the annular capacitance element C1 is similarly increased as compared to the state shown in FIG. 2.

Figure 8:
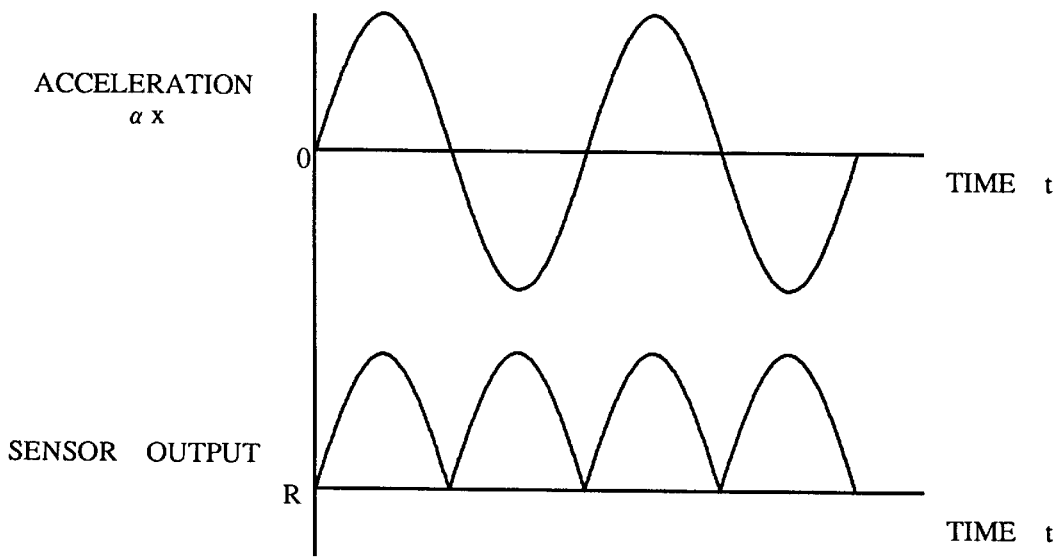
FIG. 8 shows graphs indicating a relationship between acceleration αx applied to the acceleration sensor shown in FIG. 1 and sensor output.

Eventually, a change of the electrostatic capacitance value of the annular capacitance element C1 constituted by the annular fixed electrode E11 and the annular displacement electrode E21 indicates a magnitude of acceleration $\pm\alpha x$ applied in the X-axis direction, in other words, force $\pm Fx$ applied in the X-axis direction. Accordingly, when an electrostatic capacitance value of the annular capacitance element C1 is electrically taken out as a sensor output, this sensor functions as an acceleration sensor for outputting a magnitude of acceleration $\pm\alpha x$ applied in the X-axis direction as an electric signal. FIG. 8 shows graphs indicating a relationship between the applied acceleration $\alpha x$ and the sensor output. As indicated in the upper graph of FIG. 8, when a transverse vibration with respect to the X-axis direction is generated by earthquake, an acceleration αx in the X-axis direction alternately takes positive and negative values. On the contrary, even if an acceleration αx is applied in the positive direction of the X-axis, or is applied in the negative direction, the sensor output (i.e., an electrostatic capacitance value of the annular capacitance element C1) anyway increases from the reference value R (the reference value R is an output value in the state where no acceleration is applied). Accordingly, the sensor output is as indicated by the lower graph of FIG. 8. In view of the above, when a converting circuit capable of outputting, as a voltage, the electrostatic capacitance value of the annular capacitance element C1 is prepared so that a detecting circuit is constitute by using this converting circuit to detect a deviation of the electrostatic capacitance value of the electrostatic capacitance element C1, an output voltage of the detecting circuit can be utilized as an absolute value of an acceleration ±αx applied in the X-axis direction as it is. In addition, if a sensor output as shown in the lower graph of FIG. 8 is smoothed, it is possible to obtain an average value of vibrations. In addition, if such a sensor output is integrated, it is possible to obtain an accumulated energy value of vibrations.

While, in the above explanation, the operation of the acceleration sensor has been described in connection with the case where an acceleration ±αx in the X-axis direction is applied, it should be considered that such a detecting operation is carried out not only with respect to the acceleration ±αx in the X-axis direction, but also with respect to the acceleration ±αy in the Y-axis direction. In other words, since the fixed substrate 10, the displacement substrate 20, the annular fixed electrode E11, and the annular displacement electrode E21 are all rotation symmetrical with respect to the center axis W as previously described, also in the case where an acceleration ±αy in the Y-axis direction is applied, it is possible to detect an absolute value of the acceleration by entirely the same detecting operation. It is a matter of course that such a detecting operation is not limited to the X-axis or the Y-axis. Also in the case where an acceleration with respect to an arbitrary direction included within an XY plane is applied, entirely the same detection can be carried out. In conclusion, this acceleration sensor can detect, with the same sensitivity, an acceleration in any direction of 360 degree on the XY plane, and thus has no directivity with respect to the XY plane. This is the ideal property in using such an acceleration sensor as a seismometer or an impact meter.

For example, if this acceleration sensor is installed at an earthquake observation point so that the XY plane is in correspondence with the horizontal plane, it becomes possible to detect magnitudes of transverse vibrations in all directions at this observation point on the basis of an electrostatic capacitance value of the annular capacitance element C1. In addition, if this acceleration sensor is mounted in a vehicle so that the XY plane is in correspondence with a traveling surface, it becomes possible to detect magnitudes of all impacts applied in directions along the traveling surface with respect to the vehicle on the basis of an electrostatic capacitance value of the annular capacitance element C1.

In the conventional three-dimensional acceleration sensors, it was possible to specify so far as its direction with respect to the transverse vibration. However, as previously described above, in carrying out supply control of the city gas or operation control of the elevator, it is sufficient for an acceleration sensor to detect whether or not a transverse vibration exceeds a predetermined threshold value. Moreover, in carrying out the operation control of the air bag in automotive vehicle, it is sufficient for an acceleration sensor to detect whether or not an impact from the front, the back or the side exceeds a predetermined threshold value. The acceleration sensor according to this invention sufficiently satisfies such condition. In addition, its detection output can be directly obtained as an electrostatic capacitance value of the annular capacitance element C1. Therefore, necessary and sufficient acceleration detection can be carried out with very simple configuration.

§3 Longitudinal Vibration Detecting Operation of the Fundamental Embodiment of this Invention The above-described acceleration sensor of the fundamental embodiment has a function to detect not only "transverse vibration" but also "longitudinal vibration". As previously described, in the case where the acceleration sensor is utilized as a seismometer, it is desirable to have an ability to respectively independently detect "transverse vibration" based on the S-wave and "longitudinal vibration" based on the P-wave. The detecting operation of the "longitudinal vibration" based on the P-wave will now be described. In this embodiment, an amplitude of the "longitudinal vibration" is detected on the basis of an electrostatic capacitance value of the central capacitance element C2 constituted by the central fixed electrode E12 and the central displacement electrode E22.

Figure 9:
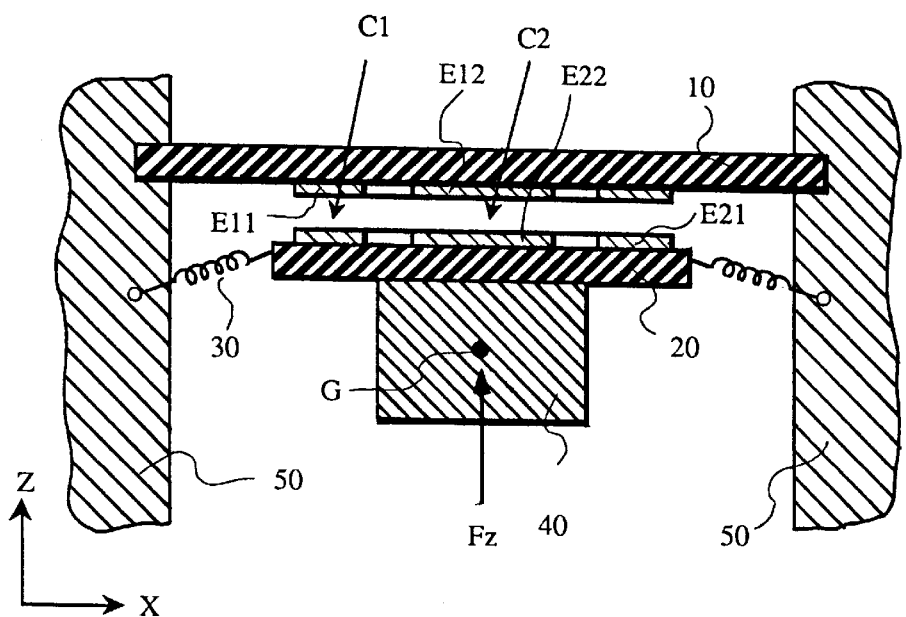
FIG. 9 is a side cross sectional view for explaining an operation when force Fz in the positive direction of the Z-axis is applied to the acceleration sensor shown in FIG. 1.

It is now assumed that when an acceleration sensor having a structure as shown in FIG. 2 is installed at a predetermined earthquake observation point and this observation point is vibrated (oscillated) in the Z-axis direction. Such an oscillation is an oscillation of the "longitudinal vibration" based on the P-wave. When the observation point is reciprocally vibrated (oscillated) in both positive and negative directions of the Z-axis, the weight body 40 is oscillated in the Z-axis direction within the sensor casing 50. Namely, an acceleration αz in the Z-axis direction is applied to the weight body 40. For this reason, force expressed as Fz=m·αz is applied to the center of gravity G of the weight body 40 having mass m. As previously described, the supporting means 30 is caused to undergo elastic deformation by action of such a force, so the displacement substrate 20 is caused to undergo displacement relative to the fixed substrate 10. The side cross sectional view of FIG. 9 shows a state of displacement of the displacement substrate 20 when force Fz is applied in the positive direction of the Z-axis. It is a matter of course that since an oscillation of "longitudinal vibration" by the earthquake alternately produces an acceleration in the positive direction of the Z-axis and an acceleration in the negative direction of the Z-axis, force Fz in the positive direction of the Z-axis and force −Fz in the negative direction of the Z-axis are alternately applied to the weight body 40. FIG. 9 shows an instantaneous state of such an oscillation.

Let now consider that when the displacement substrate 20 is caused to undergo displacement as shown in FIG. 9, how an electrostatic capacitance value of the central capacitance element C2 constituted by the central fixed electrode E12 and the central displacement electrode E22 changes. When a change in state takes place from the first state as shown in FIG. 2 to the second state as shown in FIG. 9, since a distance d between the electrodes becomes small with respect to the central capacitance element C2, the electrostatic capacitance value C2 becomes large. In contrast, in the case where force −Fz in the negative direction of the Z-axis is applied to the weight body 40, the weight body 40 is caused to undergo displacement in a lower direction of the figure. Thus, a distance d between the electrodes of the central capacitance element C2 becomes large so that the electrostatic capacitance value C2 becomes small. Accordingly, when an oscillation of "longitudinal vibration" by the earthquake is propagated, the weight body 40 is oscillated in upper and lower directions of FIG. 9. As a result, a distance d between the electrodes of the central capacitance element C2 periodically changes in such a manner that the distance d becomes small or large, and the electrostatic capacitance value of the central capacitance element C2 periodically changes in such a manner that the capacitance value becomes large or small. An amplitude of such change indicates an amplitude of an oscillation based on "longitudinal vibration".

Eventually, a change of the electrostatic capacitance value of the central capacitance element C2 constituted by the central fixed electrode E12 and the central displacement electrode E22 indicates a magnitude of an acceleration ±αz applied in the Z-axis direction, i.e., force ±Fz applied in the Z-axis direction. Accordingly, if an electrostatic capacitance value of the central capacitance element C2 is electrically taken out as a sensor output, it is realized to provide an acceleration sensor for outputting, as an electric signal, a magnitude of an acceleration ±αz applied in the Z-axis direction, i.e., a magnitude of "longitudinal vibration". When such a sensor output is smoothed, an average value of vibrations can be obtained. When such a sensor output is integrated, an accumulated energy value of vibrations can be also obtained.

§4 Correction in the Fundamental Embodiment

The structure of the acceleration sensor according to the fundamental embodiment of the present invention was explained in the chapter §1 and the transverse vibration detecting operation thereof and the longitudinal vibration detecting operation thereof have been explained in the chapters §2 and §3, respectively. Further, it has been described that the transverse vibration detecting operation is carried out by the annular capacitance element C1 constituted with the annular fixed electrode E11 and the annular displacement electrode E21 and the longitudinal vibration detecting operation is carried out by the central capacitance element C2 constituted with the central fixed electrode E12 and the central displacement electrode E22. However, from a theoretical point of view, a detecting operation opposite to the above may be carried out. Namely, such an approach may be employed from a theoretical point of view that the detecting operation for transverse vibration is carried out by using the central capacitance element C2, and the detecting operation for the longitudinal vibration is carried out by using the annular capacitance element C1. Now the explanation for the opposite detecting operation will be followed.

Initially, let demonstrate that the detecting operation for transverse vibration can be carried out also by using the central capacitance element C2. For example, in a state where force Fx in the positive direction of the X-axis is applied to the weight body 40, the displacement substrate 20 is inclined as shown in FIG. 5. In this state, study is made in connection with a change of the electrostatic capacitance value of the central capacitance element C2 constituted with the central fixed electrode E12 and the central displacement electrode E22. In this state, as stated above, the electrostatic capacitance value is increased in the right side half because the distance between the electrodes becomes small and the electrostatic capacitance value is decreased in the left side half because the distance between the electrodes becomes large. In addition, since the increase of the electrostatic capacitance value is larger than the decrease thereof as indicated by the graph of FIG. 7, the electrostatic capacitance value as the entirety of the central capacitance element C2 in the state shown in FIG. 5 is greater than that in the state shown in FIG. 2. In other words, the central capacitance element C2 has a function to detect an oscillation of "transverse vibration" similarly to the annular capacitance element C1.

However, in regard to such detection of the oscillation of the "transverse vibration", the detection sensitivity of the central capacitance element C2 is very small as compared to the detection sensitivity of the annular capacitance element C1. This is because, as seen when attention is drawn to FIG. 5, in the case where the displacement substrate 20 is inclined on the basis of "transverse vibration", a change Δd of the distance d between the electrodes of the central capacitance element C2, which is disposed within the inside region of the displacement substrate 20, is small as compared to that of the annular capacitance element C1, which is disposed within the outside region of the displacement substrate 20, so that a change of the entire electrostatic capacitance value of the central capacitance element C2 is also small as compared to that of the annular capacitance element C1. In practice, a sensor output derived from a change of the electrostatic capacitance value of the central capacitance element C2 results in a signal including information of "transverse vibration" and "longitudinal vibration". In other words, in this sensor output, a signal indicating a magnitude of "transverse vibration" is superimposed on a signal indicating magnitude of the "longitudinal vibration". Actually, the latter is very small as compared to the former. Therefore, in practice, the sensor output with respect to the central capacitance element C2 can be regarded as a signal indicating the magnitude of the "longitudinal vibration".

Subsequently, let demonstrate that the detecting operation for longitudinal vibration can be carried out also by using the annular capacitance element C1. For example, in a state where force Fz in the positive direction of the Z-axis is applied to the weight body 40, the displacement substrate 20 is caused to undergo displacement as shown in FIG. 9. In this state, study is made in connection with a change of the electrostatic capacitance value of the annular capacitance element C1 constituted by the annular fixed electrode E11 and the annular displacement electrode E21. Since the distance d between the electrodes becomes small, the electrostatic capacitance value is increased. In contrast, in a state where force −Fz in the negative direction of the Z-axis is applied to the weight body 40, since the displacement substrate 20 is caused to undergo displacement in a lower direction in FIG. 9, the electrostatic capacitance value of the annular capacitance element C1 is decreased because the distance d between the electrodes becomes large. Accordingly, a change of the electrostatic capacitance value of the annular capacitance element C1 indicates a magnitude of the "longitudinal vibration". Thus, the annular capacitance element C1 has a function to detect an oscillation of the "longitudinal vibration" similarly to the central capacitance element C2.

Accordingly, a sensor output derived from a change of the electrostatic capacitance value of the annular capacitance element C1 results in a signal including information of "transverse vibration" and "longitudinal vibration". In other words, in this sensor output, a signal indicating a magnitude of "longitudinal vibration" is superimposed on a signal indicating the magnitude of the "transverse vibration". In this case, if the latter would become smaller to such a degree that it can be neglected as compared to the former, the sensor output with respect to the annular capacitance element C1 could be regarded as a signal indicating the magnitude of the "transverse vibration". Unfortunately, however, in practice, the latter cannot be neglected. Namely, when a state as shown in FIG. 9 is considered, a displacement degree of the annular displacement electrode E21 and a displacement degree of the central displacement electrode E22 are just the same. Therefore, when a "longitudinal vibration" is applied to this sensor, a signal indicating the magnitude of the "longitudinal vibration" can be sufficiently obtained in both of the central capacitance element C2 and the annular capacitance element C1. In other words, a sensor output obtained with respect to the annular capacitance element C1 includes a signal indicating a magnitude of the "transverse vibration" and a signal indicating a magnitude of the "longitudinal vibration", where both the signals are considered to be significant signals which cannot be disregarded. For this reason, in order to handle a sensor output obtained in the annular capacitance element C1 as a signal indicating the magnitude of the "transverse vibration", a correction to subtract a signal component indicating the magnitude of the "longitudinal vibration" must be carried out.

As a matter of fact, the detecting operation for transverse vibration described in the chapter §2 is to be correct under the environment where no "longitudinal vibration" exists. In other words, the operation is not correct in precise under the environment where "longitudinal vibration" exists. On the contrary, the detecting operation for longitudinal vibration described in the chapter §3 makes it possible to detect a magnitude of the "longitudinal vibration" with a sufficient accuracy from a viewpoint of practical use even under the environment where "transverse vibration" exists. Accordingly, in the case where the acceleration sensor according to this invention is used under the environment where both "longitudinal vibration" and "transverse vibration" exist, it is necessary to carry out correction with respect to the transverse vibration detecting operation described in the chapter §2. An example of the correction method thereof will be disclosed below.

The fundamental concept of this correction is very simple. As mentioned above, a signal derived from the annular capacitance element C1 includes a component indicating an amplitude of the "transverse vibration" and a component indicating an amplitude of the "longitudinal vibration" and both the component can not be negligible. On the contrary, though a signal derived from the central capacitance element C2 theoretically includes a component indicating an amplitude of the "longitudinal vibration" and a component indicating an amplitude of the "transverse vibration", however, the latter can be neglected because it is very small as compared to the former. Therefore, in practice, a signal derived from the central capacitance element C2 can be regarded as only a component indicating an amplitude of the "longitudinal vibration". In view of this, if a correction to subtract the component indicating the amplitude of the "longitudinal vibration", which is detected in the central capacitance element C2, from the sum of the components indicating the amplitudes of the "transverse vibration" and the "longitudinal vibration", which is detected in the annular capacitance element C1 is carried out, only the component indicating the amplitude of the "transverse vibration" can be obtained.

Figure 10:
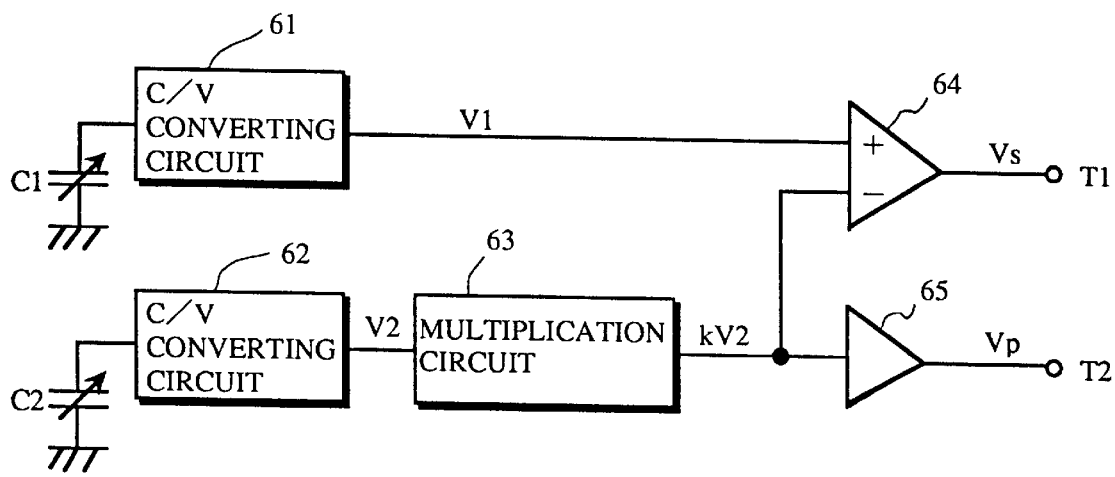
FIG. 10 is a circuit diagram showing an example of a detection circuit used for the acceleration sensor shown in FIG. 1.

FIG. 10 is a circuit diagram showing an example of a detection circuit having a function to carry out the correction operation (calculation) on the basis of the above described fundamental concept. In FIG. 10, variable capacitance elements C1 and C2 indicated at the left end are equivalent circuits respectively to the annular capacitance element C1 and the central capacitance element C2. Moreover, a C/V converting circuit 61 and a C/V converting circuit 62 are respectively circuits for converting electrostatic capacitance values of the annular capacitance element C1 and the central capacitance element C2 into voltage values. In this detection circuit, a calibration is made such that output voltages of the C/V converting circuits 61 and 62 become zero volt under the condition when "longitudinal vibration" and "transverse vibration" do not exist, i.e., in the state where no acceleration is applied. Accordingly, the output voltage V1 of the C/V converting circuit 61 indicates a change of the electrostatic capacitance value of the annular capacitance element C1 and the output voltage V2 of the C/V converting circuit 62 indicates a change of the electrostatic capacitance value of the central capacitance element C2. As described above, the output voltage V1 is sum of the component indicating an amplitude of the "transverse vibration" and the component indicating an amplitude of the "longitudinal vibration", though the output voltage V2 can be regarded as the component indicating an amplitude of only the "longitudinal vibration" in practice.

The voltage V2 outputted from the C/V converting circuit 62 is amplified by a multiplication circuit 63 so that a voltage multiplied by k is provided. The voltage kV2 thus obtained is delivered to an input terminal of the minus side of a differential amplifier 64. In this embodiment, when the area of the annular fixed electrode E11 (or the annular displacement electrode E21) is assumed to be S1 and the area of the central fixed electrode E12 (or the central displacement electrode E22) is assumed to be S2, k is set to a value of "area ratio" given by the following relational expression:

$k=S1/S2.$

On the other hand, an input terminal of the plus side of the differential amplifier 64 is supplied with the voltage V1 outputted from the C/V converting circuit 61. Accordingly, in the differential amplifier 64, a calculation expressed below is carried out.

$Vs=V1-k \cdot V2.$

As a result, a voltage Vs is outputted to the output terminal T1. Moreover, a voltage (k·V2) which is outputted from the multiplication circuit 63 is outputted to the output terminal T2 as an output voltage Vp through a buffer circuit 65. It is to be noted that while the output signal kV2 of the multiplication circuit 63 is delivered to the input terminal of the buffer circuit 65 in the circuit of FIG. 10, the output signal V2 of the C/V converting circuit 62 may be directly delivered to the input terminal of the buffer circuit 65.

The voltage Vp outputted to the output terminal T2 in this way indicates the magnitude of the "longitudinal vibration" detected by this acceleration sensor. In the case where such an acceleration sensor is used as a seismometer, the above-mentioned voltage Vp indicates the magnitude of the P-wave. This is because the above-mentioned voltage Vp becomes a voltage proportional to a change of the electrostatic capacitance value of the central capacitance element C2. On the other hand, the voltage Vs outputted to the output terminal T1 indicates the magnitude of the "transverse vibration" detected by this acceleration sensor. In the case where such an acceleration sensor is used as a seismometer, the above-mentioned voltage Vs indicates the magnitude of the S-wave. The reason thereof is that since the voltage V1 is sum of the component indicating the magnitude of the "transverse vibration" and the component indicating the magnitude of the "longitudinal vibration" detected by this acceleration sensor and voltage (k·V2) is the component indicating the magnitude of the "longitudinal vibration" detected by this same acceleration sensor, the voltage Vs determined as a difference between the voltage V1 and the voltage (k·V2) becomes a voltage corresponding only to the component indicating the magnitude of the "transverse vibration".

In this embodiment, the reason why the voltage V2 is multiplied by "area ratio k" of the electrodes is to correct the detection sensitivity resulting from difference of the area. Namely, as shown in FIGS. 3 and 4, the areas of the electrodes E11, E21 constituting the annular capacitance element C1 and the areas of the electrodes E12, E22 constituting the central capacitance element C2 are different from each other (the former >the latter, in the example illustrated). Accordingly, even in the case where the magnitude of the "longitudinal vibration" is detected on the basis of the principle shown in FIG. 9, a difference corresponding to the "area ratio k" would takes place between the detection value in the annular capacitance element C1 and the detection value in the central capacitance element C2. Namely, with respect to the capacitance element having greater electrode area, a larger detection voltage is obtained. To compensate this, such an approach is employed to multiply one detection value by area ratio k in the multiplication circuit 63 to thereby correct the difference of the detection sensitivity based on the difference between the electrode areas. It is to be noted while, in the circuit of FIG. 10, the multiplication circuit 63 is provided at the succeeding stage of the C/V converting circuit 62 to carry out processing for multiplying the voltage V2 by k, the multiplication circuit 63 may be provided at the succeeding stage of the C/V converting circuit 61 in a manner opposite to the above to carry out processing for multiplying the voltage V1 by (1/k).

§5 Device for simplifying the correction

In the above-described chapter §4, it has been described that the detection circuit shown in FIG. 10 is used, thereby making it possible to carry out a correction processing for precisely detecting the magnitude of the "transverse vibration" under the environment where the "longitudinal vibration" and the "transverse vibration" exist in a mixed state. However, the multiplication circuit 63 in the detection circuit shown in FIG. 10 is not necessarily required. By devising the configuration of the electrodes, this multiplication circuit 63 may be omitted. Namely, when the fact that the electrostatic capacitance value C of the capacitance element is expressed by $$C = \epsilon(S/d)$$

is taken into consideration, the following approach may be useful. Let assume that the distance d1 is a distance between the pair of electrodes E11 and E21 constituting the annular capacitance element C1, the distance d2 is a distance between the pair of electrodes E12 and E22 constituting the central capacitance element C2, the area S1 is an area of the electrodes E11 and E21, and the area S2 is an area of the electrodes E21, E22 and the relationship expressed $$S1/(d1)^2 = S2/(d2)^2$$

is satisfied in a static state where no acceleration is applied. If the electrode configuration of the sensor satisfies the above relationship, the detection sensitivities of the "longitudinal vibration" of the annular capacitance element C1 and the central capacitance element C2 become equal to each other. Accordingly, the multiplication circuit 63 in the detection circuit shown in FIG. 10 can be omitted in this sensor.

To give more detailed explanation, the ground where the above-mentioned relational expression is derived is described below. Let now consider an electrostatic capacitance element having an electrode area S, a distance d between the electrodes and a dielectric constant $\epsilon$ between the electrodes. In the case where the distance d between the electrodes of the electrostatic capacitance element is widened by $\Delta d$, the electrostatic capacitance value is decreased by $\Delta C$ expressed by the following relational expression:

$$\begin{aligned}\Delta C &= \epsilon(S/d) - \epsilon(S/(d+\Delta d)) \\ &= \epsilon S(1/d) \cdot (1 - (1 + \Delta d/d)^{-1}).\end{aligned}$$

If $\Delta d$ is assumed to be sufficiently small as compared to d, the approximation described below is obtained.

$$(1+\Delta d/d)^{-1} = (1-\Delta d/d)$$

Eventually, the above-mentioned relational expression is rewritten as follows:

$$\begin{aligned}\Delta C &= \epsilon S(1/d) \cdot (1 - (1 - \Delta d/d)) \\ &= \epsilon S(1/d) \cdot (\Delta d/d) \\ &= \epsilon (S/d^2) \cdot \Delta d.\end{aligned}$$

Accordingly, when plural capacitance elements whose values of $(S/d^2)$ are the same are prepared, even if a distance d between the electrodes is varied by $\Delta d$, changes of the electrostatic capacitance values $\Delta C$ of the respective capacitance elements are substantially the same. In view of this, if the annular capacitance element C1 and the central capacitance element C2 are constituted by such electrodes to satisfy the following relational expression:

$$S1/(d1)^2 = S2/(d2)^2,$$

the detection sensitivities of the "longitudinal vibration" can be equal to each other. Thus, the multiplication circuit 63 can be omitted.

Figure 11:
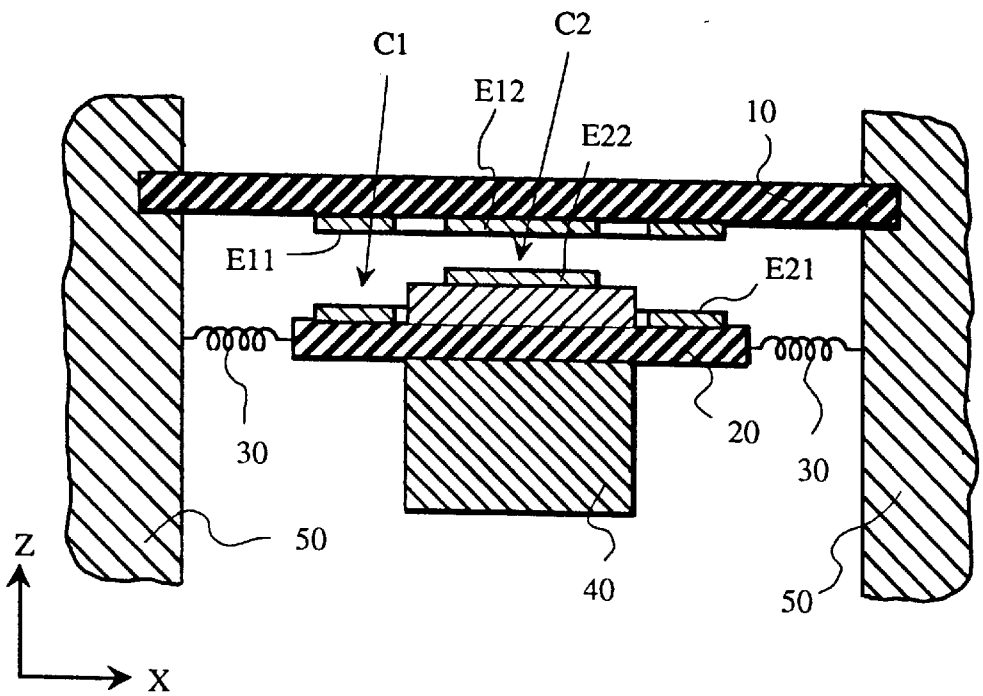
FIG. 11 is a side cross sectional view showing the structure of a modified example of the acceleration sensor shown in FIG. 1.

FIG. 11 is an example of the acceleration sensor having such an electrode configuration to satisfy the above-mentioned relational expression. Namely, between the area S1 of the electrodes E11, E21 constituting the annular capacitance element C1 and the area S2 of the electrodes E12, E22 constituting the central capacitance element C2, the relationship expressed as S1>S2 is held. In addition, there is employed a configuration such that between the distance d1 of the electrodes E11 and E21 constituting the annular capacitance element C1 and the distance d2 of the electrodes E12 and E22 constituting the central capacitance element C2, the relationship expressed as d1>d2 is held, thus allowing the detection sensitivities of the "longitudinal vibration" of both the capacitance elements C1, C2 to be equal to each other.

Figure 12:
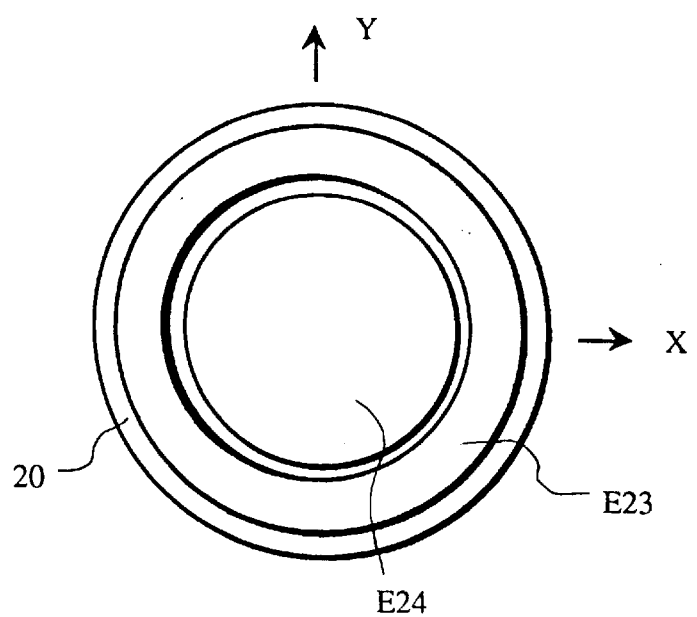
FIG. 12 is a top view of the displacement substrate 20 in the modified example of the acceleration sensor shown in FIG. 1.

In order to realize the above-described configuration, it is necessary to provide an offset on the surface where the electrodes is formed of the displacement substrate 20 (or of the fixed substrate 10) as shown in the example shown in FIG. 11. In order to avoid such an offset structure, it is sufficient to employ a configuration such that the area S1 of the electrodes E11, E21 constituting the annular capacitance element C1 and the area S2 of the electrodes E21, E22 constituting the central capacitance element C2 are equal to each other. For example, if there is employed a configuration, as the top view is shown in FIG. 12, such that an annular displacement electrode E23 and a central displacement electrode E24 which are the same in the area are formed on the displacement substrate 20, and opposite electrodes corresponding thereto are formed also on the lower surface of the fixed substrate 10, the annular capacitance element C1 and the central capacitance element C2 are the same with respect to both the distance between the electrodes and the electrode area. Thus, the detection sensitivities of the "longitudinal vibration" are equal to each other. It is to be noted that when the diameter of the central displacement electrode E24 is too great (long) as shown in FIG. 12, the component of the "transverse vibration" which is included in a change of the electrostatic capacitance value of the central capacitance element C2 may not be disregarded, and it is therefore necessary to pay attention to this fact. In order to carry out an acceleration detection which is as efficient as possible and is precise, it is desirable to dispose the respective annular electrodes in the vicinity of the outer circumference of the substrate as close as possible, and to make the respective central electrodes to be as small as possible.

§6 Embodiment using common Electrode

While this invention has been described on the basis of the fundamental embodiment, an embodiment using a common electrode in order to allow the structure to be more simple will now be described. In the above-described fundamental embodiment, as shown in FIG. 3, the annular fixed electrode E11 and the central fixed electrode E12 which are respectively physically independent were formed on the lower surface of the fixed substrate 10 and, as shown in FIG. 4, the annular displacement electrode E21 and the central displacement electrode E22 which are respectively physically independent were formed on the upper surface of the displacement substrate 20. Namely, the four electrode layers in total which are physically independent are formed. However, it is not necessarily required to form four electrode layers in a manner described above.

For example, in the detection circuit shown in FIG. 10, the variable capacitors C1 and C2 indicated at the left end respectively correspond to the annular capacitance element C1 and the central capacitance element C2 where the respective one electrodes thereof are both grounded. Accordingly, in order to carry out the acceleration detection on the basis of the previously described principle, the electrodes E11, E12 formed on the fixed substrate 10 or the electrodes E21, E22 formed on the displacement substrate 20 may be replaced by a physically unitary (single) common electrode. In this case, when the common electrode is grounded, it is possible to constitute the detection circuit shown in FIG. 10. For example, the two independent electrodes E11, E12 formed on the fixed substrate 10 may be replaced by a single common electrode. That is, when a single disk-shaped common electrode having the same diameter as the outer (outside) diameter of the annular fixed electrode E11 is prepared, the function equivalent to the two independent electrodes E11, E12 can be performed by the single common electrode. Alternatively, the two independent electrodes E21, E22 formed on the displacement substrate 20 may be replaced by a common electrode. That is, when a single disk-shaped common electrode having the same diameter as the outer (outside) diameter of the annular displacement electrode E21 is prepared, the function equivalent to the two independent electrodes E21, E22 can be performed by the single common electrode.

When such a common electrode is employed, the structure of the entirety of the acceleration sensor becomes more simple. Further, if a portion of the fixed substrate 10 or a portion of the displacement substrate 20 is used as a common electrode, it is possible to make the structure more simple. For example, if a substrate consisting of conductive material such as metal is used as a fixed substrate 10 shown in FIG. 3, it becomes unnecessary to form the annular fixed electrode E11 or the central fixed electrode E12. That is, if such a fixed substrate 10 consisting of conductive material is opposed to the displacement substrate 20 shown in FIG. 4, a portion of the fixed substrate 10 facing (opposite) to the annular displacement electrode E21 performs the function as the annular fixed electrode E11, and a portion of the fixed substrate 10 facing (opposite) to the central displacement electrode E22 performs the function as the central fixed electrode E12.

Alternatively, if a substrate consisting of conductive material such as metal is used as a displacement substrate 20 shown in FIG. 4 in a manner opposite to the above, it becomes unnecessary to form the annular displacement electrode E21 or the central displacement electrode E22. That is, if such a displacement substrate 20 consisting of conductive material is opposed to the fixed substrate 10 shown in FIG. 3, a portion of the displacement substrate 20 facing (opposite) to the annular fixed electrode E11 performs the function as the annular displacement electrode E21, and a portion of the displacement substrate 20 facing (opposite) to the central fixed substrate E12 performs the function as the central displacement electrode E22. In fact, embodiments disclosed in the chapters §7 and §8 which will be described below are directed to the embodiment of this type.

§7 First more Practical Embodiment of the Invention

With respect to the acceleration sensor according to the fundamental embodiment which has been described in the chapter §1, the operation and the modified examples thereof have been described so far. In this acceleration sensor, the periphery of the displacement substrate 20 is supported by the supporting means 30 composed of the eight springs. However, such a structure is not necessarily optimum in order to realize more practical acceleration sensors suitable for mass-production. A more practical embodiment in which plural slits are formed on a flexible substrate to thereby constitute a diaphragm to be used as a displacement substrate and supporting means will now be disclosed.

Figure 13:
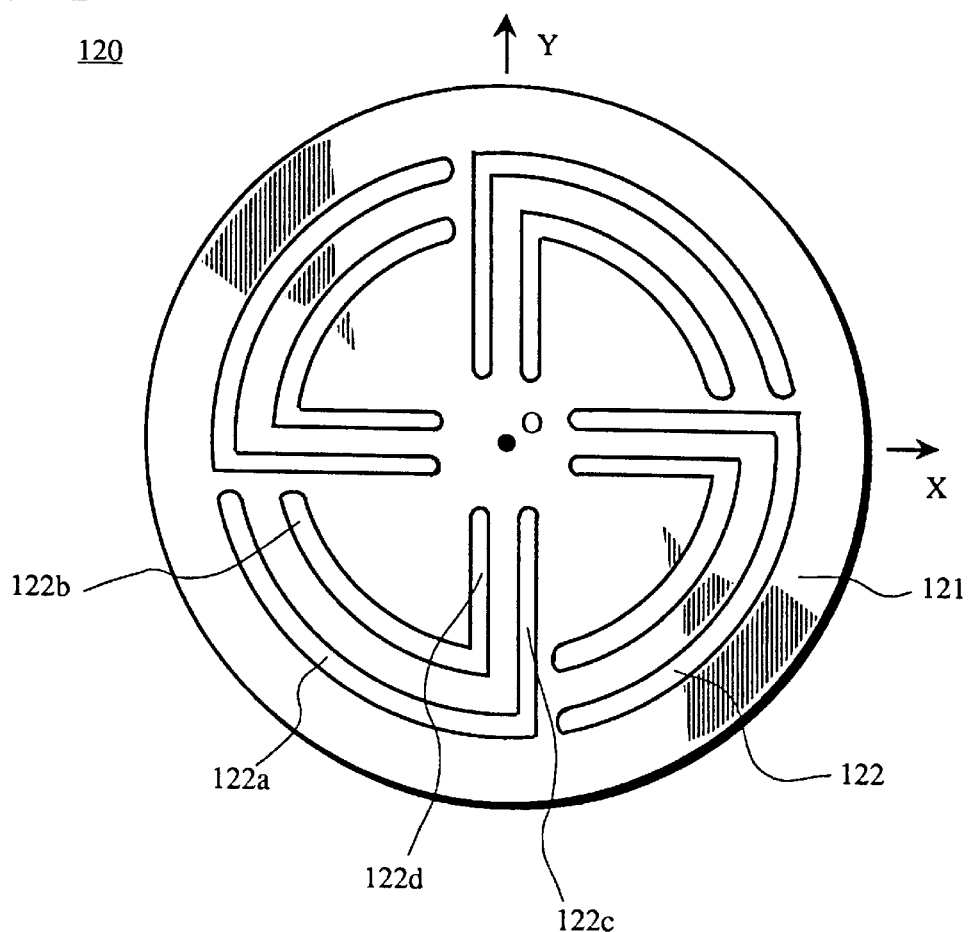
FIG. 13 is a top view of a diaphragm 120 used for an acceleration sensor according to a more practical embodiment of this invention.

Initially, a diaphragm 120 of which plan view is shown in FIG. 13 is prepared. This diaphragm 120 is made of a disk-shaped flexible substrate 121 (a thin metallic plate in this embodiment) having a plurality of slits 122. These slits 122 can be classified into two groups. The slits belonging to the first group are circular arc shaped slits 122a, 122b formed along annular lines in a circumferential form surrounding the central point O, and the slits belonging to the second group are slits 122c, 122d in a linear form formed along radial lines from the central point O toward the external. Further, the slits 122a, 122b belonging to the first group and the slits 122c, 122d belonging to the second group are connected to each other at the end portions thereof or in the vicinity of the end portions. Particularly, in the embodiment shown in FIG. 13, the circumferential slits are constituted by outside circular arc slits 122a and inside circular arc slits 122b, where the outside arc slits 122a and the inside arc slits 122b are arranged along double concentric circles surrounding the central point O. On the contrary, the linear slits are constituted by the slits 122c and the slits 122d, a respective pair of which are arranged in parallel.

Since a plurality of slits having such a pattern are formed on the diaphragm 120, the respective portions of the diaphragm 120 are physically connected by beam (joint) portions between the slits. Namely, an isolated portion such that the entire periphery is encompassed (surrounded) by slits does not exist by any means, and all the respective portions are physically connected to the other portions by beam (joint) portions between slits. As a whole, a single physical diaphragm is obtained. When the peripheral portion of the diaphragm 120 is fixed and force is applied to the central point O, a displacement takes place at the central portion on the basis of an elastic deformation of beam (joint) portions between slits. Such a diaphragm 120 performs both the functions of the displacement substrate 20 and the supporting means 30 in this invention. In addition, since the diaphragm 120 consists of conductive material (a metallic plate), this diaphragm 120 further has a function as a common electrode filling the double role of the annular displacement electrode E21 and the central displacement electrode E22.

Figure 14:
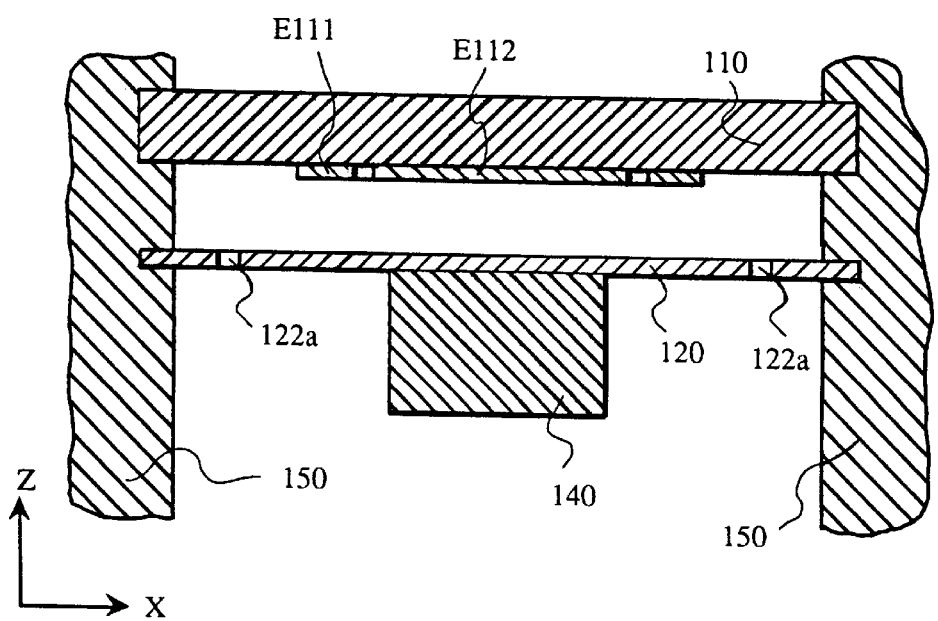
FIG. 14 is a side cross sectional view of an acceleration sensor according to the embodiment using the diaphragm 120 shown in FIG. 13.
Figure 15:
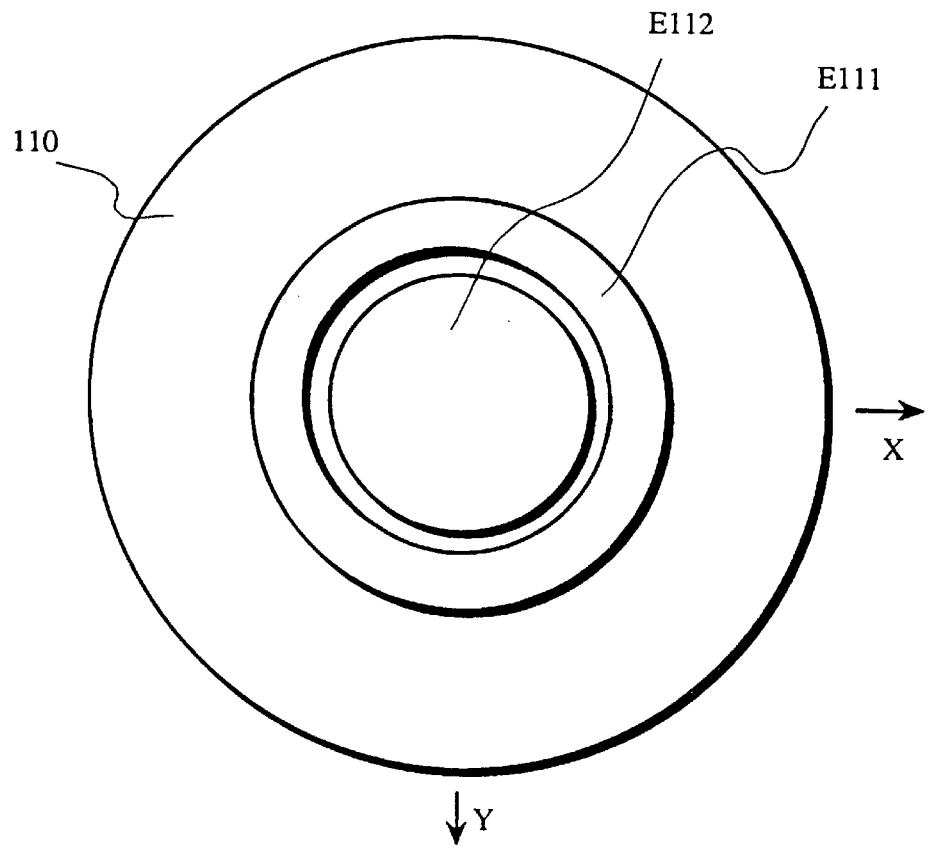
FIG. 15 is a bottom view of the displacement substrate 110 in the acceleration sensor shown in FIG. 14.

An embodiment of an acceleration sensor constituted by using such a diaphragm 120 is shown in the side cross sectional view of FIG. 14. In this embodiment, fixed substrate 110 is a disk-shaped substrate comprised of an insulating rigid body, and an annular fixed electrode E111 and a central fixed electrode E112 are formed on the lower surface thereof. FIG. 15 is a bottom view of the fixed substrate 110, wherein the shapes of the annular fixed electrode E111 and the central fixed electrode E112 are clearly shown. The diaphragm 120 is disposed with a predetermined distance with respect to the fixed substrate 110 therebelow, and a weight body 140 is secured on the lower surface thereof. The periphery of the fixed substrate 110 and the periphery of the diaphragm 120 are both fitted and supported on the inside of a cylindrical sensor casing 150. In the state where no acceleration is applied, the fixed substrate 110 and the diaphragm 120 are maintained in parallel. Thus, an annular capacitance element C1 and a central capacitance element C2 are formed. Namely, an annular area portion on the diaphragm 120 which is opposite to the annular fixed electrode E111 functions as an annular displacement electrode and an annular capacitance element C1 is formed by these opposite electrodes. Similarly, an circle area portion on the diaphragm 120 which is opposite to the central fixed electrode E112 functions as a central displacement electrode and an central capacitance element C2 is formed by these opposite electrodes.

Figure 16:
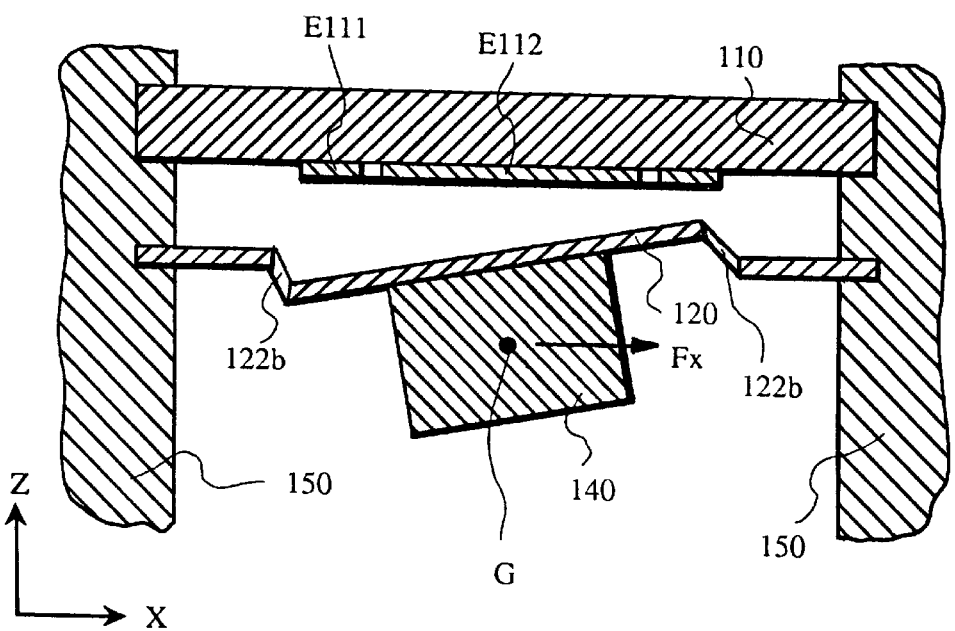
FIG. 16 is a side cross sectional view for explaining an operation when force Fx in the positive direction of the X-axis is applied to the acceleration sensor shown in FIG. 14.

The operation of this acceleration sensor is exactly the same as the sensor according to the previously described fundamental embodiment. For example, when force Fx in the positive direction of the X-axis is applied to the center of gravity G of the weight body 140, the diaphragm 120 is caused to undergo bending as shown in FIG. 16. As a result, changes take place in the electrostatic capacitance values of the annular capacitance element C1 and the central capacitance element C2. Based on these changes, "transverse vibration" and "longitudinal vibration" can be detected. Namely, in the diaphragm 120 shown in FIG. 13, a portion encompassed by the inside circular arc slits 122b performs triple functions as the displacement substrate 20, the annular displacement electrode E21 and the central displacement electrode E22 in the acceleration sensor is described in the chapter §1, and a portion outside thereof performs a function as the supporting means 30. It is to be noted that while a deformed state of the diaphragm 120 is depicted in a simplified form in FIG. 16 in order to avoid that the figure becomes complicated, the beam (joint) portions positioned between the slits 122a and the slits 122b and the beam (joint) portions positioned between the slits 122c and the slits 122d take a considerably complicated deformed state.

When the circular arc slits 122a, 122b and the linear slits 122c, 122d are formed in combination, a displacement suitable for the detecting operation of the acceleration sensor according to this invention can be carried out, while taking a very simple structure. Besides, a sufficient displacement can be obtained by the action of relatively small acceleration. For this reason, an acceleration sensor inexpensive and having a high sensitivity can be realized.

In order to allow a detection sensitivities of the "transverse vibration" with respect to all the directions to be uniform in the acceleration sensor, it is preferable from an ideal point of view to allow the structure of the diaphragm 120 to take a completely rotation symmetrical shape with respect to the central point O. However, since physical slits 122 are formed, it is impossible to take a completely rotation symmetrical shape. In view of the above, in this embodiment, respective slits 122 are formed so that when the flexible substrate 121 is rotated by 90 degrees within a plane including the principal surface of the substrate, a pattern of slits substantially becomes in correspondence with the pattern before rotation. By employing such a configuration, at least a displacement state when a "transverse vibration" in the X-axis direction is applied and a displacement state when a "transverse vibration" in the Y-axis direction is applied are substantially the same. On the contrary, strictly speaking, a displacement state when a "transverse vibration" in a direction of 45 degrees with respect to the X-axis is applied is slightly different from a displacement state when a "transverse vibration" in the X-axis direction is applied. However, from a viewpoint of practical use, since circular arc slits 122a, 122b are formed, it may be considered that substantially equal displacements can be obtained in regard to all the directions of 360 degree about the central point O. Thus, "transverse vibration" components in all the directions can be detected with a substantially uniform sensitivity.

In order to ensure the substantial non-directivity in regard to the "transverse vibration" sensitivity, it is sufficient to form respective slits 122 so that when the flexible substrate 121 is rotated by θ degree within a plane including the principal surface thereof, a pattern of slits substantially becomes in correspondence with the pattern before rotation. In order to enhance the non-directivity, it is sufficient to allow θ (θ=90 degree in the example of FIG. 13) to be smaller.

In addition, if a technique such as laser processing or etching, etc. is used, it is possible to form slits having width of about 100 μm. By forming slits of very thin width, the non-directivity can be further improved.

§8 Second more Practical Embodiment of the Invention

Figure 17:
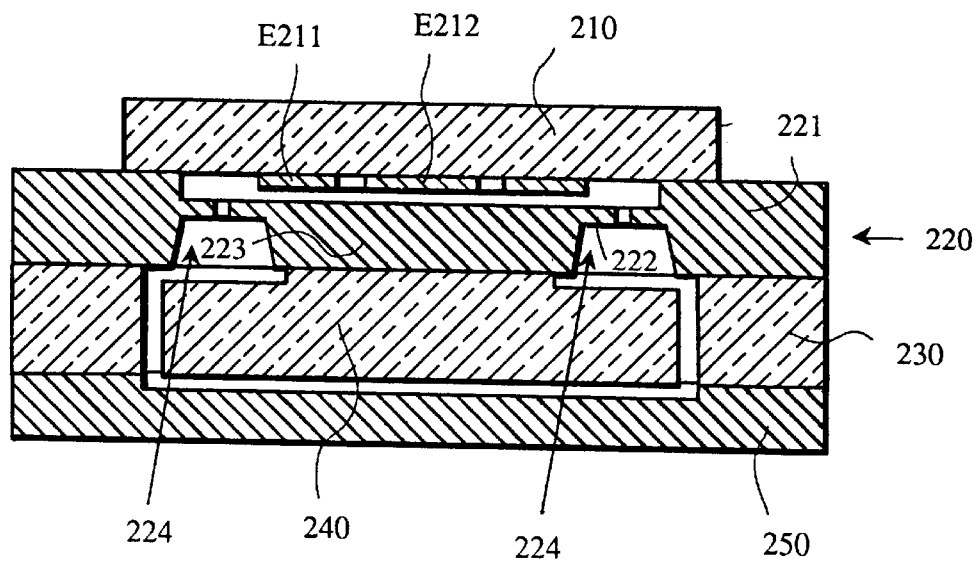
FIG. 17 is a side cross sectional view of an acceleration sensor according to another more practical embodiment of this invention.

FIG. 17 is a side cross sectional view showing a further different form of a more practical embodiment of this invention. This acceleration sensor includes a fixed substrate 210 made of glass, a displacement substrate 220 made of silicon, a pedestal 230 made of glass, a weight body 240 similarly made of glass, and a bottom substrate 250 made of silicon. The displacement substrate 220 is composed of three portions of a fixed portion 221 provided on a periphery, a flexible portion 222 provided on an inside of the fixed portion 221, and a working portion 223 surrounded by the flexible portion 222. A groove 224 square annular shaped when viewed from the lower surface is dug on the lower surface of the displacement substrate 220, and a portion where the groove 224 is formed is thin in thickness. The flexible portion 222 is a portion corresponding to the region where the groove 224 is formed, and has flexibility because the thickness is small. In addition, a plurality of slits 225 are formed on the flexible portion 222.

Figure 18:
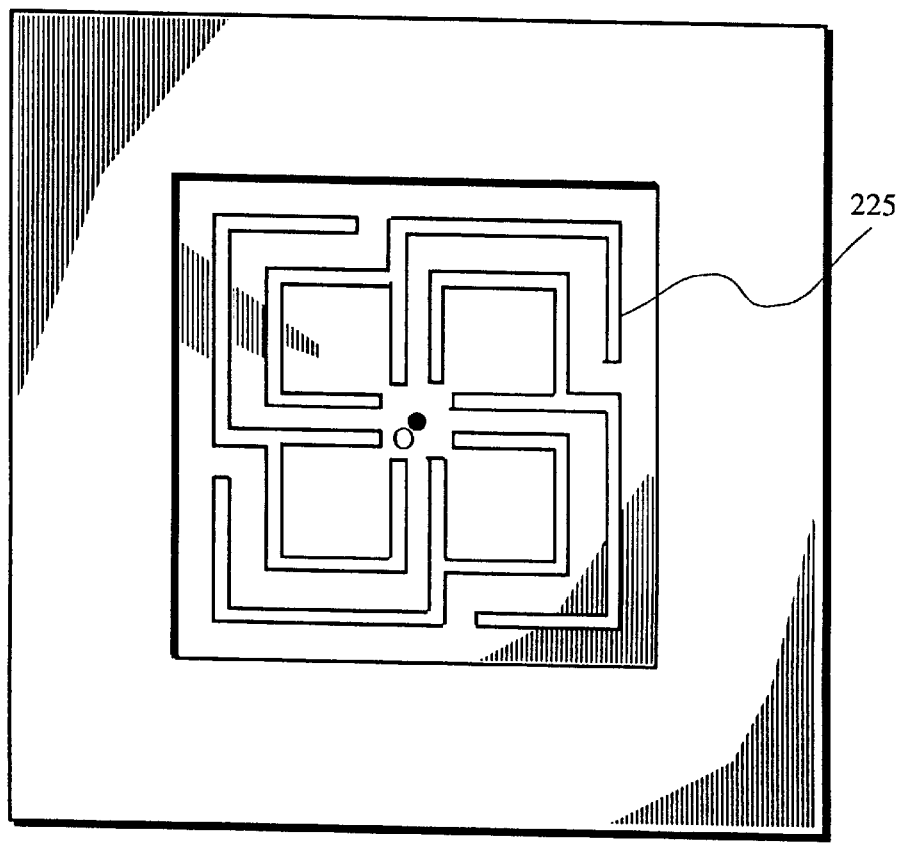
FIG. 18 is a top view of the displacement substrate 220 used for the acceleration sensor shown in FIG. 17.

FIG. 18 is a top view of the displacement substrate 220, wherein the pattern of slits is clearly shown. The pattern of slits 225 shown in FIG. 18 has a similarity to the pattern of slits 122 shown in FIG. 13. Namely, the slit pattern shown in FIG. 18 is constituted by slits belonging to the first group formed along square annular lines surrounding the central point O and slits belonging to the second group formed along radial lines from the central point O toward the external, and the slits belonging to the first group and the slits belonging to the second group are connected to each other at the end portions thereof or in the vicinity of the end portions. In addition, respective slits 225 are formed so that when the displacement substrate 220 is rotated by 90 degrees within a plane including a principal surface thereof, a pattern of slits substantially becomes in correspondence with the pattern before rotation.

The flexible portion 222 is a portion of which thickness is reduced by formation of the groove 224. In addition, because this portion is a portion where slits 225 as shown in FIG. 18 are formed, the flexible portion 222 has sufficient flexibility. The working portion 223 is a portion in which the periphery thereof is supported by the flexible portion 222, and is also a portion to which force applied to the weight body 240 is transmitted. Accordingly, when an acceleration is applied to the weight body 240, force produced resulting from the acceleration is transmitted to the working portion 223. Thus, the flexible portion 222 is caused to undergo an elastic deformation.

A shallow groove is dug in the regions corresponding to the flexible portion 222 and the working portion 223 of the upper surface of the displacement substrate 220, and a small space is formed between the upper surface corresponding to these region and the lower surface of the fixed substrate 210. An annular fixed electrode E211 and a central fixed electrode E212 are formed on the lower surface of the fixed substrate 210. Area portions of the upper surface of the displacement substrate 220 opposite to these electrodes with space respectively function as an annular displacement electrode and a central displacement electrode. Thus, an annular capacitance element C1 and a central capacitance element C2 are formed.

Eventually, in the acceleration sensor according to this embodiment, the working portion 223 and the flexible portion 222 perform the function as the displacement substrate 20 of the acceleration sensor described in the chapter §1, and the flexible portion 222 and the fixed portion 221 perform the function as the supporting means 30 of the acceleration sensor described in the chapter §1. In this example, since the weight body 240 in the acceleration sensor is adapted so that the periphery thereof is surrounded by the pedestal 230 and the bottom substrate 250 is disposed on the lower surface, even in the case where an excessive acceleration is applied, an excessive displacement of the weight body 240 is suppressed by contact with the inside surface of the pedestal 230 or the upper surface of the bottom substrate 250. For this reason, it is possible to prevent that the weight body 240 is caused to undergo an excessive displacement by action of an excessive acceleration. Therefore it is prevented that an excessive stress is applied to the flexible portion 222 to make damage.

The acceleration sensor of the embodiment shown in FIG. 17 is very suitable for mass-production, because the respective substrates consist of glass or silicon. That is, the manufacturing process can be carried out by making use of conventional semiconductor manufacturing technologies or micro-machining technologies. Moreover, the pedestal 230 and the weight body 240 can be formed by cutting primarily a single substrate. Further, the electrodes formed on the lower surface of the fixed substrate 210 can be formed by, e.g., the process for fusing metal such as aluminum, etc., and bonding between the respective substrates can be carried out by using a technology such as anode bonding, etc. In addition, since the detection circuit as shown in FIG. 10 can be formed as a semiconductor circuit on the displacement substrate 220 or the base substrate 250 consisting of silicon, it is also possible to realize an acceleration sensor wherein a detection circuit is included within a single chip.

§9 More Rigorous Correction

As has been already explained in the chapter §4, in the acceleration sensor according to this invention, by using a circuit as shown in FIG. 10, a voltage Vs indicating "transverse vibration" is obtained on the output terminal T1, and a voltage Vp indicating "longitudinal vibration" is obtained on the output terminal T2. Further, if a specific electrode configuration is employed as has been described in the chapter §5, the multiplication circuit 63 may be omitted. However, the circuit shown in FIG. 10 is a detection circuit based on the premise that the voltage V2 indicating a change of the electrostatic capacitance of the central capacitance element C2 consists of only a component of "longitudinal vibration". Theoretically, the voltage V1 (a change of the electrostatic capacitance of the annular capacitance element C1) and the voltage V2 (a change of the electrostatic capacitance of the central capacitance element C2) are both including both the components indicating the amplitude of "transverse vibration" and the amplitude of "longitudinal vibration". Nevertheless, since a component indicating "transverse vibration" is very small as compared to a component indicating "longitudinal vibration" as far as the voltage V2 is concerned, a practical big problem does not takes place even if the former is neglected and an approximation is made such that the voltage V2 consists of only the latter. For this reason, in the circuit of FIG. 10, the voltage V2 is used as an amplitude value of the "longitudinal vibration" as it is to carry out the correction with respect to the voltage V1 on the basis of the voltage V2.

Figure 19:
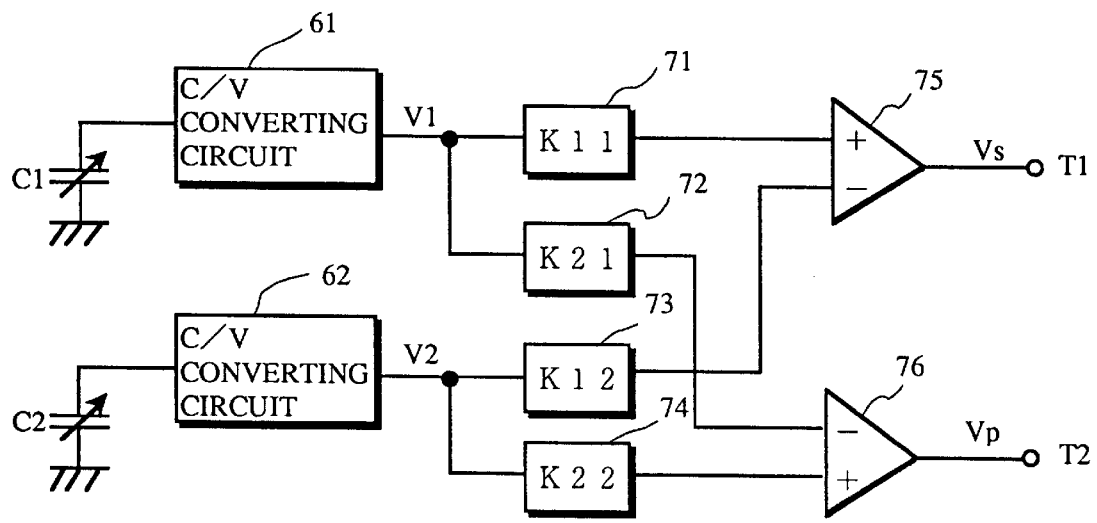
FIG. 19 is a circuit diagram showing another example of a detection circuit used for the acceleration sensor shown in FIG. 1.

However, in the case where more rigorous detection is carried out, it is necessary to carry out handling in consideration of the fact that a component indicating an amplitude of the "transverse vibration" is also included in the voltage V2 as a matter of course. In the case of carrying out such rigorous detection, it is sufficient to use a circuit shown in FIG. 19 in place of the circuit shown in FIG. 10. Variable capacitance elements C1 and C2 indicated at the left end of the figure in the circuit shown in FIG. 19 are equivalent circuits respectively indicating the annular capacitance element C1 and the central capacitance element C2 similarly to the circuit shown in FIG. 10. Moreover, C/V converting circuits 61 and 62 are also circuits for converting respective electrostatic capacitance values into voltage values similarly to the circuit shown in FIG. 10. A calibration such that when an acceleration to be detected is zero, the output voltages become equal to zero volts is made. Accordingly, the voltage V1 indicates a change of the electrostatic capacitance value of the annular capacitance element C1, and the voltage V2 indicates a change of the electrostatic capacitance value of the central capacitance element C2. Theoretically, the voltages V1 and V2 both consist of a component indicating an amplitude of the "transverse vibration" and a component indicating an amplitude of the "longitudinal vibration".

Assuming now that an output voltage indicating only an amplitude of the "transverse vibration" is a voltage Vs and an output voltage indicating only an amplitude of the "longitudinal vibration" is a voltage Vp. The aim of this detection circuit is to perform an operation with respect to the voltages V1, V2 to determine the voltages Vs, Vp to output these voltages to the output terminals T1, T2. In the detection circuit shown in FIG. 19, such an operation is performed by multiplication circuits 71 to 74, and differential amplifiers 75, 76. This operation will be explained below.

As previously described, since the voltages V1, V2 are the sum of a component indicating an amplitude of the "transverse vibration" (corresponding to voltage Vs) and a component indicating an amplitude of the "longitudinal vibration" (corresponding to the voltage Vp), two equations as described below are established:

$$V1 = M11 \cdot Vs + M12 \cdot Vp$$

$$V2 = M21 \cdot Vs + M22 \cdot Vp.$$

In the above equations, M11, M12, M21 and M22 are respectively predetermined proportional constants. In the correction described in the chapter §4, since the proportional constant M21 is very small as compared to the proportional constant M22, an approximation is made such that M21 is equal to zero to output the voltages Vs, Vp on the basis of two equations described below:

$$V1 = M11 \cdot Vs + M12 \cdot Vp$$

$$V2 = M22 \cdot Vp.$$

Namely, from these two equations, the relationship expressed below is obtained.

$$V1 = M11 \cdot Vs + (M12/M22) \cdot V2$$

Accordingly, the following equations are obtained.

$$Vs = (V1 - (M12/M22) \cdot V2)/M11$$

$$Vp = V2/M22$$

In view of this, in the detection circuit shown in FIG. 10, the multiplication circuit 63, in which setting is made such that k=(M12/M22), is used in order to calibrates the gain of the differential amplifier 64 so that it is equal to (1/M11). Then the gain of the buffer circuit 65 is calibrated so that it is equal to (1/M22). Thus, the voltage Vs is obtained at the output terminal T1 and the voltage Vp is obtained at the output terminal T2.

In order to obtain rigorous detection values, all of the proportional constants M11, M12, M21, M22 must not be neglected. In this case, in the two simultaneous equations described below $$V1 = M11 \cdot Vs + M12 \cdot Vp$$

$$V2 = M21 \cdot Vs + M22 \cdot Vp,$$

since the voltage values V1, V2 are obtained by an actual measurement and M11, M12, M21, M22 are proportional constants having predetermined values, unknown quantities are only two values of Vs, Vp. Accordingly, if these two simultaneous equations are solved, the solutions of the unknown quantities can be obtained. In order to obtain such solutions by an operation using an analog circuit, it is sufficient to employ the following approach from a practical point of view. Now, when the above-described two simultaneous equations are represented by a determinant, the following relationship is obtained.

$$\begin{bmatrix} V1 \\ V2 \end{bmatrix} = \begin{bmatrix} M11 & M12 \\ M21 & M22 \end{bmatrix} \begin{bmatrix} Vs \\ Vp \end{bmatrix}$$

When this determinant is solved in terms of Vs, Vp, a determinant as described below is obtained.

$$\begin{bmatrix} Vs \\ Vp \end{bmatrix} = \begin{bmatrix} M11 & M12 \\ M21 & M22 \end{bmatrix}^{-1} \begin{bmatrix} V1 \\ V2 \end{bmatrix}$$

$$= \begin{bmatrix} K11 & -K12 \\ -K21 & K22 \end{bmatrix} \begin{bmatrix} V1 \\ V2 \end{bmatrix}$$

In the above determinant, K11, K12, K21, K22 are elements of the inverse matrix with respect to the matrix having M11, M12, M21, M22 as elements. In view of the above, this inverse matrix is determined by an operation of determining the respective values of those elements K11, K12, K21, K22. Then, the multiplication circuits 71 to 74 having multiplication constants of K11, K12, K21, K22, respectively, are prepared to assemble a detection circuit shown in FIG. 19. In this detection circuit, operations as described below $$Vs = K11 \cdot V1 - K12 \cdot V2$$

$$Vp = -K21 \cdot V1 + K22 \cdot V2$$

have been assumed to be performed. This is nothing but the operation of the above-described determinant using the inverse matrix. Accordingly, in accordance with the analog operation circuit shown in FIG. 19, the voltage Vs obtained at the output terminal T1 indicates a rigorous amplitude value of the "transverse vibration" and the voltage Vp obtained at the output terminal T2 indicates a rigorous amplitude value of the "longitudinal vibration".

§10 Other Modified Examples

While the acceleration sensor according to this invention has been described in accordance with several embodiments, this invention is not limited to these embodiments, but may be carried out in various forms in addition to the above. For example, while the above-mentioned embodiments all comprise both the annular capacitance element C1 and the central capacitance element C2, if the acceleration sensor is used in such an environment that only the "transverse vibration"takes place, it is sufficient to form only the annular capacitance element C1. For example, in the case where the acceleration sensor is utilized as an impact detector mounted on an automotive vehicle, only a component of the "transverse vibration" ordinarily takes place under a collision between automotive vehicles or a collision between an automotive vehicle and a building, etc. Therefore, an impact component of the "longitudinal vibration" can be neglected. Since it is unnecessary to carry out a correction with respect to the "longitudinal vibration" component in such an environment, it is sufficient to form only the annular capacitance element C1.

Moreover, while respective electrodes are all completely rotation symmetrical with respect to the center axis W in the above-described embodiments, it is not necessarily required from a viewpoint of practical use that they are completely rotation symmetrical. It is a matter of course that, for the purpose of allowing the "transverse vibration" detection to have non-directivity as far as possible, it is preferable that the annular electrode is rotation symmetrical, and for the purpose of preventing a component of the "transverse vibration" from interfering with a component of the "longitudinal vibration" as far as possible, it is preferable that the central electrode is rotation symmetrical.

Figure 20:
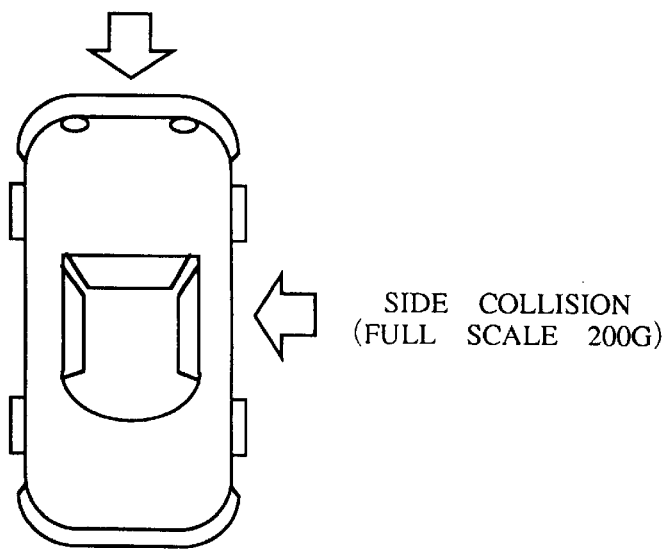
FIG. 20 is a view for explaining directivity of detection sensitivity in the case when the acceleration sensor is used as an impact detector for collision of automotive vehicle.

However, there are instances where it is preferable to intensionally make a directional sensitivity with respect to the "transverse vibration" for particular purposes. For example, in the case where an acceleration sensor is used as an impact detector for controlling an air bag in an automotive vehicle, it is preferable that a frontal detection sensitivity of impact caused by the frontal collision is different from a side detection sensitivity of impact caused by the side collision. This is because, as shown in FIG. 20, an impact acceleration applied to the driver seat at the time of side collision generally has a tendency to be greater than that at the time of frontal collision. In more practical sense, it is considered that, as an acceleration sensor mounted in an automotive vehicle, it is sufficient that the full scale of the impact acceleration by the frontal collision is about 50 G, whereas the full scale of the impact acceleration by the side collision requires about 200 G. To meet such a requirement, it is necessary to set a detection sensitivity of an acceleration applied from the side lower than that of an acceleration applied from the front.

In order to allow the detection sensitivity to have directivity, it is sufficient to allow the shape of a pair of annular electrodes to be non-rotation symmetrical with respect to the center axis W. In the previous fundamental embodiment, the annular fixed electrode E11 is provided on the fixed substrate 10 as shown in FIG. 3. This annular fixed electrode E111 s such that both the inside contour line and the outside contour line are of complete circle. In other words, the annular fixed electrode E11 is completely rotation symmetrical with respect to the center axis W. The annular displacement electrode E21 opposite to the annular fixed electrode E11 is also completely rotation symmetrical as shown in FIG. 4. When a pair of annular electrodes which are completely rotation symmetrical are used in such a way, the detection sensitivity with respect to the "transverse vibration" in parallel to the XY plane is caused to have non-directivity. Thus, the same sensitivity can be obtained with respect to the acceleration along the X-axis direction and with respect to the acceleration along the Y-axis direction.

Figure 21:
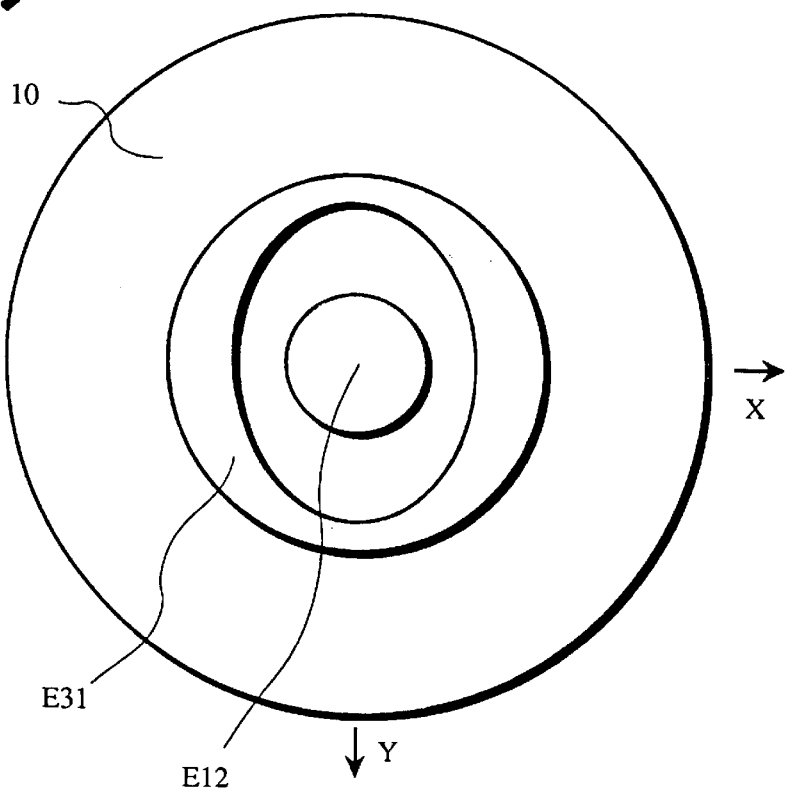
FIG. 21 is a bottom view of the fixed substrate 10 of an acceleration sensor having directivity according to the first embodiment of this invention.

However, if an annular fixed electrode E31 which is non-rotation symmetrical is formed on the fixed substrate 10 as shown in FIG. 21 and an annular displacement electrode of the same shape (not shown) is formed on the displacement substrate 20, an acceleration sensor having a directivity with respect to the "transverse vibration" in parallel to the XY-plane can be realized. This annular fixed electrode E31 is such that the outside contour line is of complete circle (round), but the inside contour line is of ellipse having long axis in the Y-axis direction, wherein the electrode width of the portion intersecting with the X-axis is broader than the electrode width of the portion intersecting with the Y-axis. For this reason, even in the case where an acceleration of the same magnitude is applied, a change of the electrostatic capacitance value caused by an acceleration applied in the X-axis direction becomes greater than a change of the electrostatic capacitance value caused by an acceleration applied in the Y-axis direction. In other words, a detection sensitivity in the X-axis direction becomes higher than a detection sensitivity in the Y-axis direction. Accordingly, if this acceleration sensor is mounted on an automotive vehicle so that the X-axis is directed to the front, a full scale of the impact acceleration by the side collision becomes greater than a full scale of the impact acceleration by the frontal collision.

Figure 22:
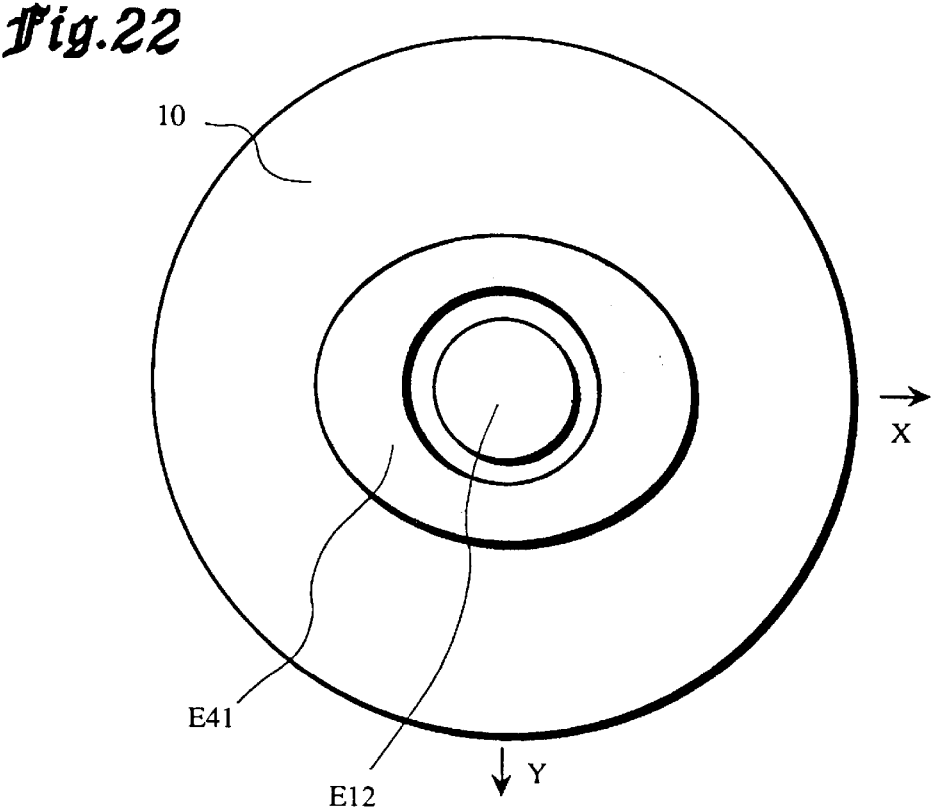
FIG. 22 is a bottom view of the fixed substrate 10 of an acceleration sensor having directivity according to the second embodiment of this invention.

FIG. 22 is a view showing an embodiment in which another annular fixed electrode E41, which takes non-rotation symmetrical shape, is formed on the fixed substrate 10. This annular fixed electrode E41 is such that the inside contour line is of complete circle and the outside contour line is of ellipse having a long axis in the X-axis direction. Similarly to the above, the electrode width of the portion intersecting with the X-axis is broader than the electrode width of the portion intersecting with the Y-axis. Accordingly, if an annular displacement electrode of the same shape (not shown) is formed on the displacement substrate 20, an acceleration sensor having directivity in which an X-axis detection sensitivity is higher than a Y-axis detection sensitivity can be realized.

Figure 23:
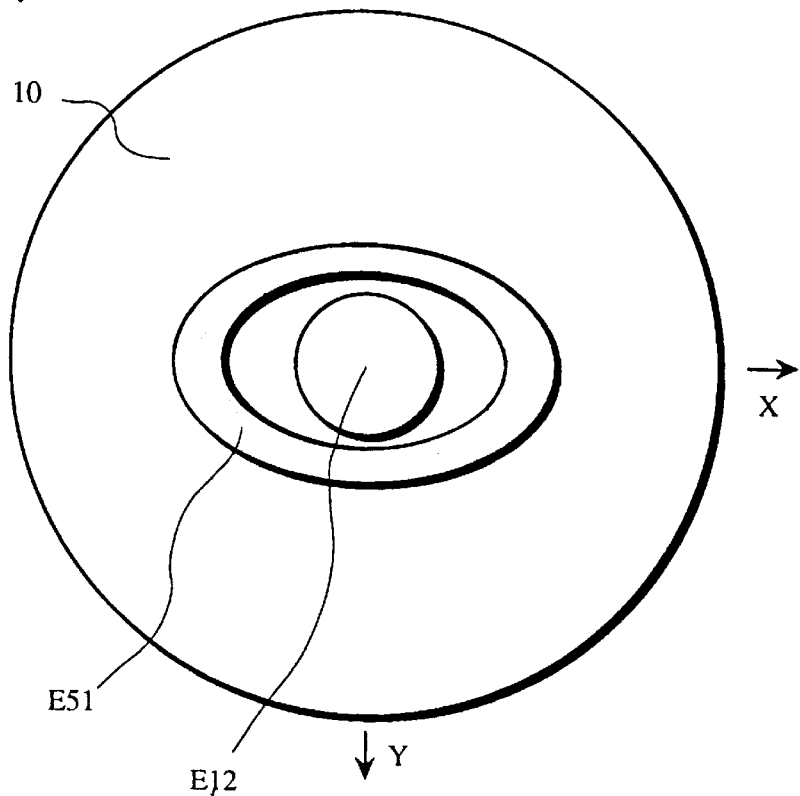
FIG. 23 is a bottom view of the fixed substrate 10 of an acceleration sensor having directivity according to the third embodiment of this invention.

FIG. 23 is a view showing an embodiment in which a further different annular fixed electrode E51 which takes non-rotation symmetrical shape is formed on the fixed substrate 10. This annular fixed electrode E51 is such that both the inside contour line and the outside contour line are of ellipse having a long axis in the X-axis direction. For this reason, while widths of the electrode are slightly different at respective portions, there is no great difference therebetween. However, with respect to a distribution of respective positions where the electrode is formed, considerable difference takes place between the portion intersecting with the X-axis and the portion intersecting with the Y-axis. Namely, the portions intersecting with the X-axis are located at positions considerably far from the center, whereas the portions intersecting with the Y-axis are located at positions relatively close to the center. Accordingly, if an annular displacement electrode of the same shape (not shown) is formed on the displacement substrate 20, even in the case where an acceleration of the same magnitude is applied, a change of the distance between the electrodes caused by an acceleration applied in the X-axis direction becomes greater than a change of the distance between the electrodes caused by an acceleration applied in the Y-axis direction. Thus, a detection sensitivity in the X-axis direction becomes higher than a detection sensitivity in the Y-axis direction.

Figure 24:
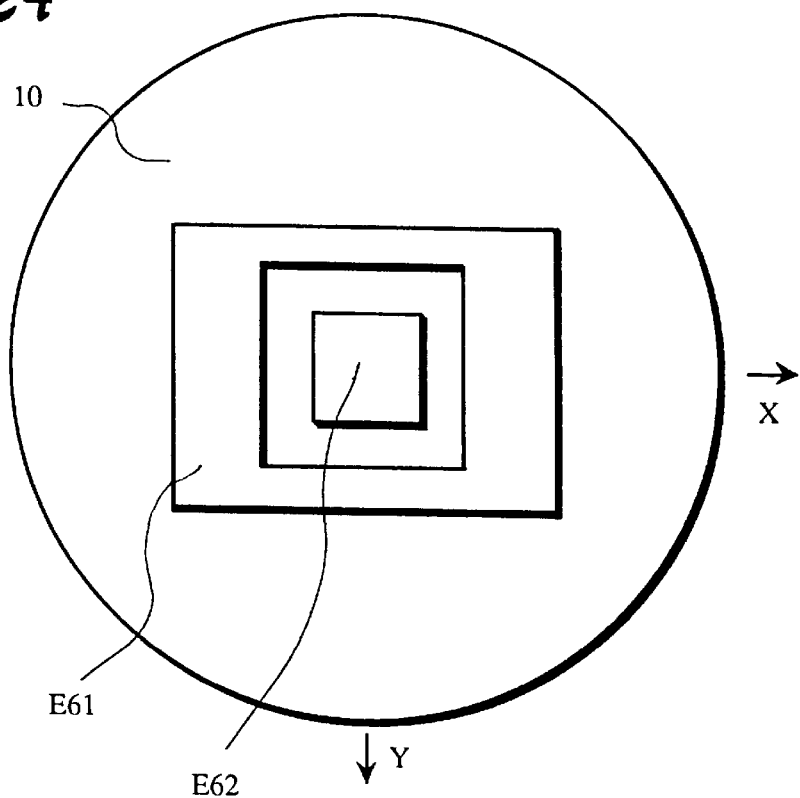
FIG. 24 is a bottom view of fixed substrate 10 of an acceleration sensor having directivity according to the fourth embodiment of this invention.

FIG. 24 is a view showing an embodiment in which a frame-shaped annular fixed electrode E61 and a central fixed electrode E62 are formed on the fixed substrate 10. In this example, the frame-shaped annular fixed electrode E61 is such that the inside contour line is square, but the outside contour line is rectangle elongated in the X-axis direction, and the central fixed electrode E62 has square shape. In this frame-shaped annular fixed electrode E61, an electrode width of a portion intersecting with the X-axis is broader than an electrode width of a portion intersecting with the Y-axis. Moreover, the portions intersecting with the X-axis are distributed at positions considerably far from the center, whereas the portions intersecting with the Y-axis are distributed at positions relatively close to the center. Accordingly, if a displacement electrode of the same shape (not shown) is formed on the displacement substrate 20, an acceleration sensor having directivity in which a detection sensitivity in the X-axis direction is higher than a detection sensitivity in the Y-axis direction can be realized.

As stated above, in accordance with the acceleration sensor according to this invention, since an applied acceleration is detected on the basis of a change of the electrostatic capacitance value of the annular capacitance element, it is possible to efficiently detect, as an electric signal, a magnitude of acceleration along a direction included within a predetermined plane.

Industrial Applicability

As stated above, in accordance with the acceleration sensor according to this invention, since an applied acceleration is detected on the basis of a change of the electrostatic capacitance value of the annular capacitance element, it is possible to efficiently detect, as an electric signal, a magnitude of an acceleration along all the directions included within a predetermined plane. Further, since an applied acceleration is detected on the basis of a change of the electrostatic capacitance value of the central capacitance element, it is also possible to detect, as an electric signal, a magnitude of an acceleration along the direction perpendicular to the above-mentioned predetermined plane. In a manner as described above, the acceleration sensor according to this invention can respectively independently detect an acceleration along a direction included within a predetermined plane and an acceleration along the direction perpendicular to the predetermined plane. For this reason, such an acceleration sensor is very useful when utilized for detection of vibration of the earthquake or detection of collision of automotive vehicle.

I claim:

1. An acceleration sensor comprising:
   a sensor casing;
   a fixed substrate secured to the sensor casing;
   a displacement substrate disposed below the fixed substrate with a predetermined distance so as to be opposite to the fixed substrate;
   supporting means for elastically supporting a periphery of the displacement substrate with respect to the sensor casing;
   a weight body secured to the displacement substrate and having a mass sufficient to allow the supporting means to include an elastic deformation by action of an acceleration to be detected;
   an annular fixed electrode formed on a lower surface of the fixed substrate and having an annular shape;
   an annular displacement electrode formed on an upper surface of the displacement substrate and functioning as an opposite electrode with respect to the annular fixed electrode; and
   a detection circuit for outputting an electric signal (Vs) indicating a magnitude (Fx) of an acceleration component in a direction in parallel to a principal surface of the fixed substrate on the basis of a value of change V1 of an electrostatic capacitance of an annular capacitance element (C1) constituted by the annular fixed electrode and the annular displacement electrode.

2. An acceleration sensor as set forth in claim 1, wherein there are further provided:
   a central fixed electrode disposed within an inside region of the annular fixed electrode on the lower surface of the fixed substrate; and
   a central displacement electrode disposed within an inside region of the annular displacement electrode on the upper surface of the displacement substrate, and functioning as an opposite electrode with respect to the central fixed electrode;
   wherein the detection circuit carries out a correction to a value of change V1 of the electrostatic capacitance of the annular capacitance element (C1) by using a value of change V2 of an electrostatic capacitance of a central capacitance element (C2) constituted by the central fixed electrode and the central displacement electrode so as to output an electric signal (Vs) indicating a magnitude (Fx) of an acceleration component in a direction in parallel to the principal surface of the fixed substrate on the basis of a corrected value.

3. An acceleration sensor as set forth in claim 2:
   wherein the detection circuit (61-65) further outputs an electric signal indicating a magnitude (Fz) of an acceleration component in a direction perpendicular to the principal surface of the fixed substrate on the basis of a value of change V2 of the electrostatic capacitance of the central capacitance element (C2).

4. An acceleration sensor as set forth in claim 2
   wherein the annular fixed electrode (E11), the annular displacement electrode (E21), the central fixed electrode (E12) and the central displacement electrode (E22) have a shape of substantially rotation symmetry with respect to a center axis (W) passing through a center of gravity (G) of the weight body (40) and perpendicular to the principal surface of the fixed substrate.

5. An acceleration sensor as set forth in claim 2
   wherein there is employed a configuration such that a distance d1 between a pair of electrodes (E11, E21) constituting the annular capacitance element (C1) and a distance d2 between a pair of electrode (E12, E22) constituting the central capacitance element (C2) are equal to each other; and
   wherein the detection circuit outputs an electric signal indicating a magnitude (Fx) of an acceleration component in a direction in parallel to the principal surface of the fixed substrate on the basis of a value Vs obtained by performing a correcting operation of $$Vs = V1 - (S1/S2) \cdot V2,$$

where V1 is a change of the electrostatic capacitance of the annular capacitance element, V2 is a change of the electrostatic capacitance of the central capacitance element, S1 is an area of respective electrodes constituting the annular capacitance element and S2 is an area of respective electrodes constituting the annular capacitance element.

6. An acceleration sensor as set forth in claim 2
   wherein there is employed a configuration in which a relationship of $$S1/(d1)^2 = S2/(d2)^2$$

is established between a distance d1 of a pair of electrodes (E11, E21) constituting the annular capacitance element (C1), a distance d2 of a pair of electrodes (E12, E22) constituting the central capacitance element (C2), an area S1 of respective electrodes constituting the annular capacitance element and an area S2 of respective electrodes constituting the central portion capacitance element; and
   wherein the detection circuit outputs an electric signal indicating a magnitude (Fx) of an acceleration component in a direction in parallel to the principal surface of the fixed substrate on the basis of value Vs obtained by performing an correcting operation of $$Vs = V1 - V2$$

where V1 is a change of the electrostatic capacitance of the annular capacitance element and V2 is a change of the electrostatic capacitance of the central capacitance element.

7. An acceleration sensor as set forth in claim 6:

wherein there is employed a configuration in which a distance d1 between a pair of electrodes (E11, E21) constituting the annular capacitance element (C1) and a distance d2 between a pair of electrodes (E12, E22) constituting the central capacitance element (C2) are equal to each other, and an area S1 of respective electrodes constituting the annular capacitance element and an area S2 of respective electrodes constituting the central capacitance element are equal to each other.

8. An acceleration sensor as set forth in claim 2 wherein the detection circuit includes a circuit (71) for multiplying a value of change V1 of the electrostatic capacitance of the annular capacitance element (C1) by a predetermined constant K11 to obtain a product K11·V1, a circuit (72) for multiplying said value of change V1 by a predetermined constant K21 to obtain a product K21·V1, a circuit (73) for multiplying a value of change V2 of the electrostatic capacitance of the central capacitance element (C2) by a predetermined constant K12 to obtain a product K12·V2, a circuit (74) for multiplying said value of change V2 by a predetermined constant K22 to obtain a product K22·V2, a circuit (75) for performing an operation expressed as (K11·V1)−(K12·V2) to obtain a value Vs, and a circuit (76) for performing an operation expressed as (K21·V1)−(K22·V2) to obtain a value Vp;

wherein said detection circuit outputs an electric signal indicting a magnitude (Fx) of an acceleration component in a direction in parallel to the principal surface of the fixed substrate on the basis of the value Vs and an electric signal indicating a magnitude (Fz) of an acceleration component in a direction perpendicular to the principal surface of the fixed substrate on the basis of the value Vp.

9. An acceleration sensor as set forth in claim 2:

wherein the annular fixed electrode and the annular displacement electrode have a shape of non-rotation symmetrical with respect to a center axis passing through a center of gravity of the weight body and perpendicular to a principal surface of the fixed substrate.

10. An acceleration sensor as set forth in claim 2:

wherein the annular displacement electrode and the central displacement electrode are a physically single electrode means (120, 220).

11. An acceleration sensor as set forth in claim 10:

wherein the displacement substrate (120, 220) is constituted by conductive material, and a portion of the displacement substrate is used as a single common electrode.

12. An acceleration sensor as set forth in claim 2:

wherein the annular fixed electrode and the central fixed electrode are constituted by a physically single common electrode.

13. An acceleration sensor as set forth in claim 12:

wherein the fixed substrate is constituted by conductive material, and a portion of the fixed substrate is used as a single common electrode.

14. An acceleration sensor as set forth in claim 1:

wherein the displacement substrate and supporting means are a flexible substrate (120, 220) having a plurality of slits (122, 225) for constituting a diaphragm.

15. An acceleration sensor as set forth in claim 14:

wherein a first group of slits (122*a*, 122*b*) are located along annular lines surrounding a central point (O) of the flexible substrate (120) and a second group of slits (122*c*, 122*d*) are located along radial lines from the central point of the flexible substrate toward an external so that a structure such that respective portions of the diaphragm are physically connected by beam portions; and wherein a peripheral portion (121) of the diaphragm is secured to the sensor casing (150) to provide a structure in which a displacement is produced in a central part of the diaphragm on the basis of an elastic deformation of the beam portions.

16. An acceleration sensor as set forth in claim 14:

wherein the respective slits are provided so that when the flexible substrate is rotated by a predetermined angle θ Within a plane including a principal surface thereof, a pattern of the slits is substantially in correspondence with a pattern before rotation.

\* \* \* \* \*